(12) United States Patent
DeLuca et al.

(10) Patent No.: US 11,583,454 B2
(45) Date of Patent: Feb. 21, 2023

(54) POWERED PATIENT SUPPORT APPARATUS

(71) Applicant: Stryker Corporation, Kalamazoo, MI (US)

(72) Inventors: Richard Thomas DeLuca, Kalamazoo, MI (US); Richard A. Derenne, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 336 days.

(21) Appl. No.: 17/032,167

(22) Filed: Sep. 25, 2020

(65) Prior Publication Data

US 2021/0007915 A1  Jan. 14, 2021

Related U.S. Application Data

(63) Continuation of application No. 16/687,906, filed on Nov. 19, 2019, now Pat. No. 10,786,406, which is a (Continued)

(51) Int. Cl.
*A61G 7/08* (2006.01)
*A61G 1/02* (2006.01)
(Continued)

(52) U.S. Cl.
CPC ......... *A61G 1/0275* (2013.01); *A61G 1/0281* (2013.01); *A61G 1/0287* (2013.01);
(Continued)

(58) Field of Classification Search
CPC .. A61G 1/0275; A61G 1/0281; A61G 1/0287; A61G 7/012; A61G 7/0524;
(Continued)

(56) References Cited

U.S. PATENT DOCUMENTS 7,332,890 B2  2/2008  Cohen et al.
7,706,917 B1  4/2010  Chiappetta et al.
(Continued)

FOREIGN PATENT DOCUMENTS

EP        1963940 B1   9/2009
WO    2015164147 A1  10/2015

*Primary Examiner* — Jacob D Knutson
*Assistant Examiner* — Marlon A Arce
(74) *Attorney, Agent, or Firm* — Warner Norcross + Judd LLP

(57) ABSTRACT

Powered patient support apparatuses—such as beds, cots, stretchers, or the like—include a plurality of user controls that allow a caregiver to control the steering and/or driving of one or more powered wheels from multiple different locations around the patient support apparatus (e.g. head end, foot end, and/or the sides). The control is carried out by force sensors that detect both an orientation of the applied forces and a magnitude of the applied forces. Translational and/or rotational movement is effectuated, depending upon the magnitude and direction of the forces, as well as the physical location of the applied force relative to a reference point on the support apparatus, such as the center. One or more object sensors may also be included in the support apparatus to assist in steering and/or navigating.

20 Claims, 22 Drawing Sheets

Related U.S. Application Data continuation of application No. 15/809,350, filed on Nov. 10, 2017, now Pat. No. 10,507,145, which is a continuation of application No. 15/004,501, filed on Jan. 22, 2016, now Pat. No. 9,833,366, which is a continuation of application No. 13/795,193, filed on Mar. 12, 2013, now Pat. No. 9,259,369.

(60) Provisional application No. 61/702,316, filed on Sep. 18, 2012.

(51) Int. Cl.
```
A61G 7/05      (2006.01)
A61G 7/012     (2006.01)
B62B 5/00      (2006.01)
B62D 51/04     (2006.01)
A61G 7/018     (2006.01)
```

(52) U.S. Cl.
CPC ........... *A61G 7/012* (2013.01); *A61G 7/0524* (2016.11); *A61G 7/0528* (2016.11); *A61G 7/08* (2013.01); *A61G 7/018* (2013.01); *A61G 7/05* (2013.01); *A61G 2203/32* (2013.01); *A61G 2203/40* (2013.01); *B62B 5/0033* (2013.01); *B62D 51/04* (2013.01)

(58) Field of Classification Search
CPC ........ A61G 7/0528; A61G 7/08; A61G 7/018; A61G 7/05; A61G 2203/32; A61G 2203/40; B62B 5/0033; B62D 51/04
See application file for complete search history.

(56) References Cited

U.S. PATENT DOCUMENTS

| | | | |
|---|---|---|---|
| 8,452,450 B2 | 5/2013 | Dooley et al. | |
| 8,572,799 B2 | 11/2013 | Won et al. | |
| 9,008,835 B2 | 4/2015 | Dubrovsky et al. | |
| 9,144,360 B2 | 9/2015 | Ozick et al. | |
| 11,039,725 B2* | 6/2021 | Johnson | A47L 9/281 |
| 11,445,881 B2* | 9/2022 | Conrad | A47L 11/4027 |
| 2010/0261948 A1* | 10/2010 | Chilton, III | A61G 12/008 600/22 |
| 2012/0198613 A1* | 8/2012 | Jelinek | A61G 7/015 5/86.1 |
| 2013/0104906 A1* | 5/2013 | Richards | A61H 9/0078 128/845 |
| 2014/0331406 A1* | 11/2014 | Haider | A61G 7/08 701/23 |
| 2017/0337797 A1* | 11/2017 | McClellan | G16H 10/60 |

\* cited by examiner

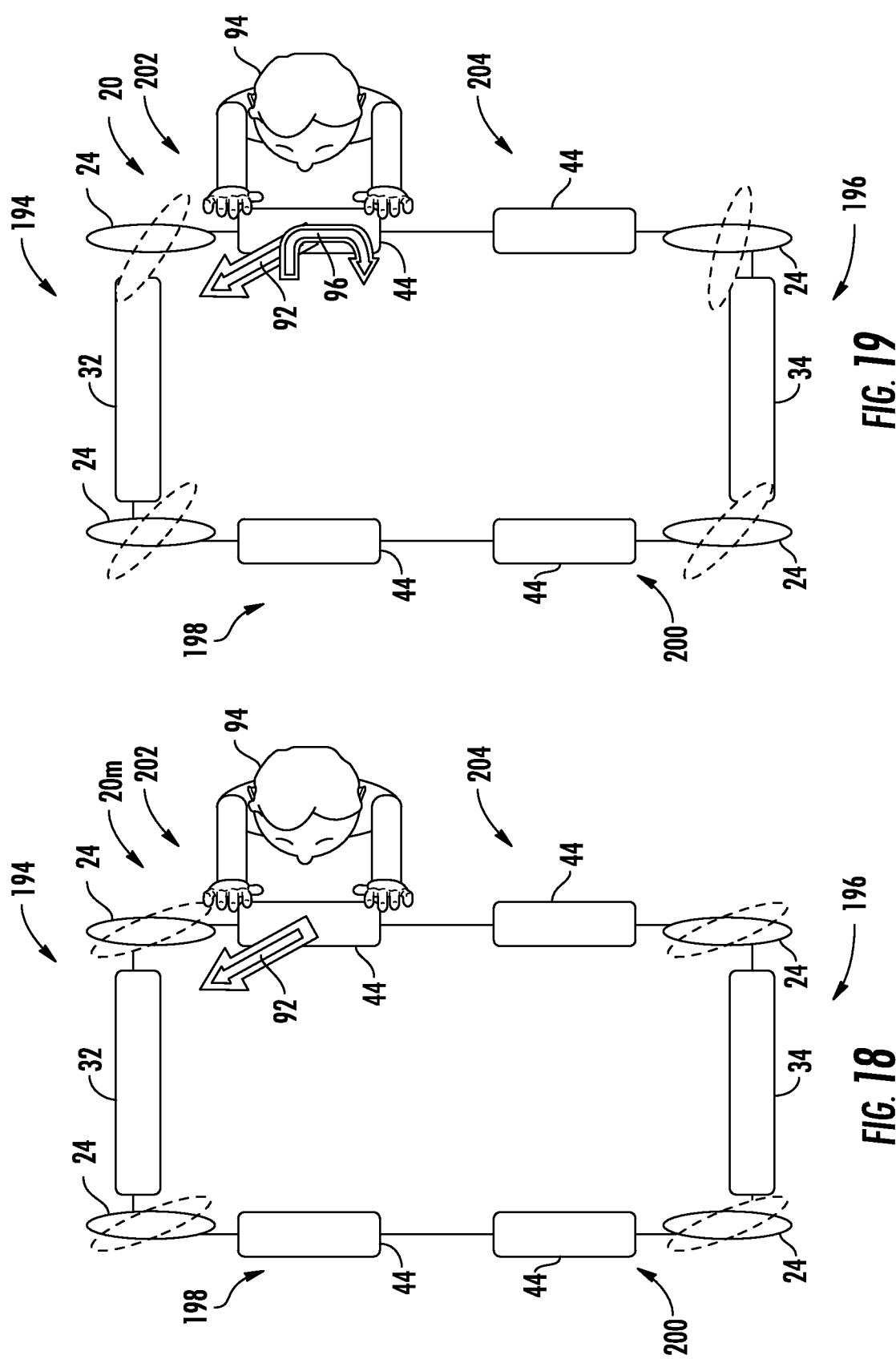

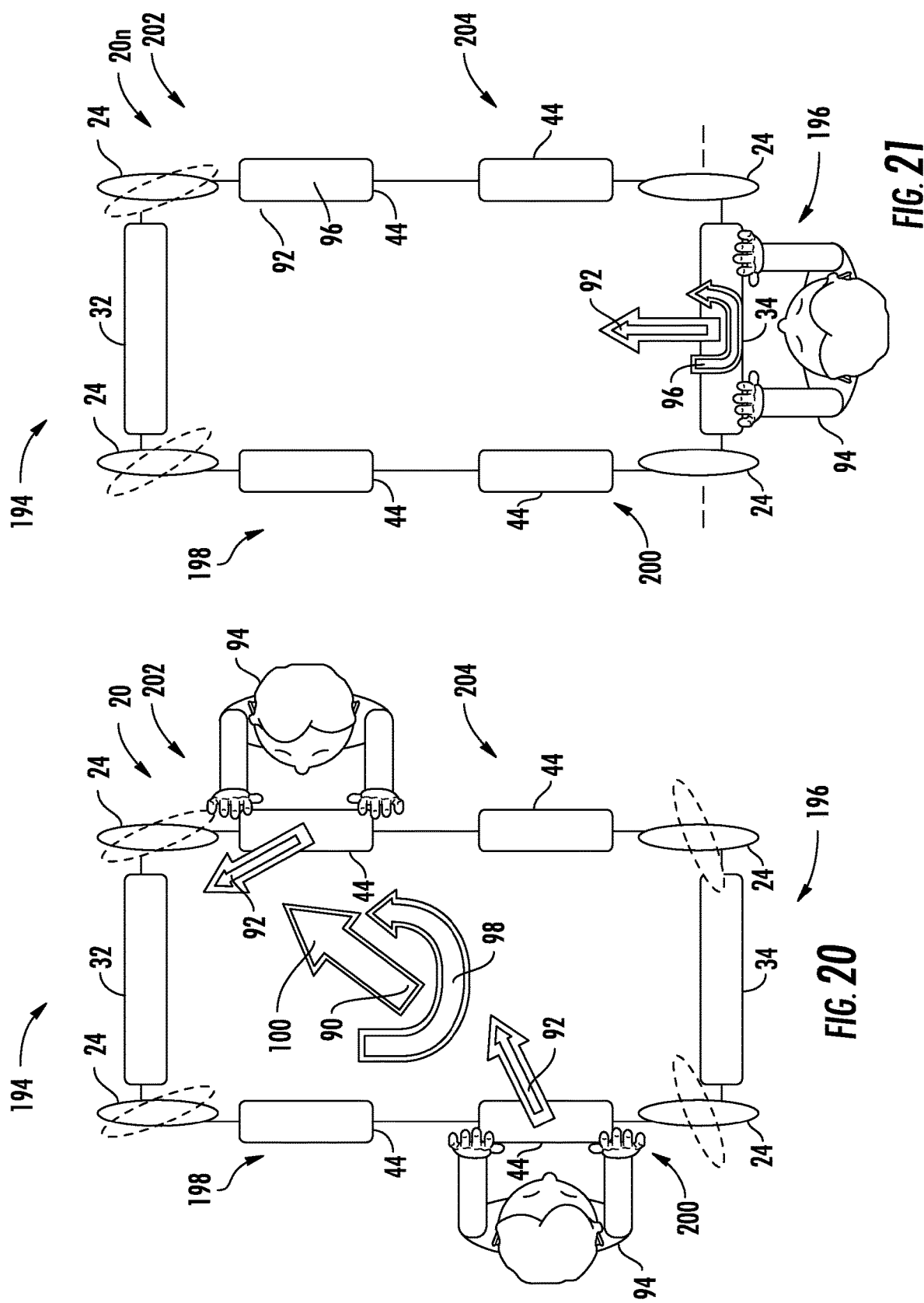

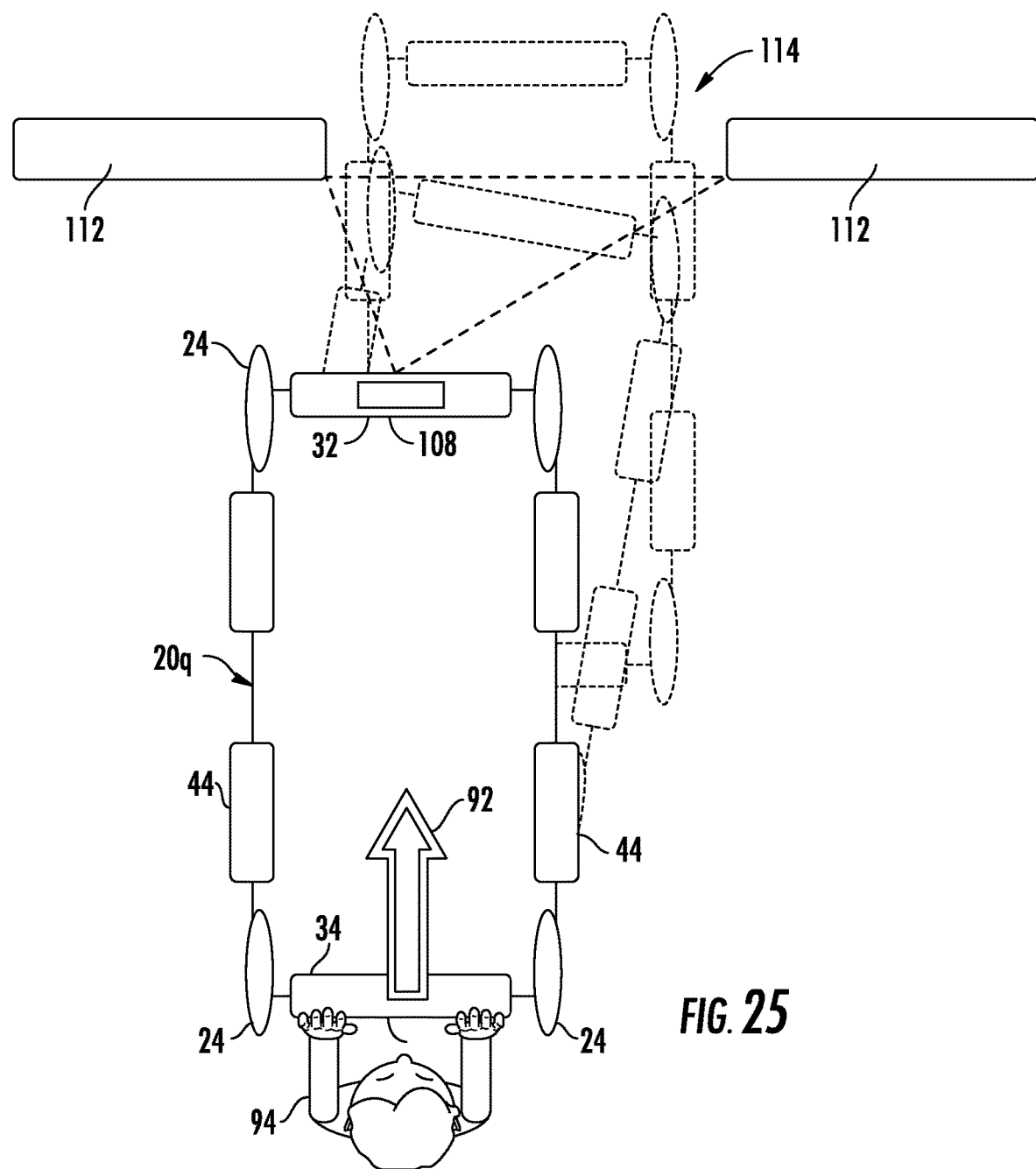

POWERED PATIENT SUPPORT APPARATUS

CROSS-REFERENCE TO RELATED APPLICATIONS

This application is a continuation of U.S. patent application Ser. No. 16/687,906 filed Nov. 19, 2019, by inventors Richard DeLuca et al. and entitled POWERED PATIENT SUPPORT APPARATUS, which in turn is a continuation of U.S. patent application Ser. No. 15/809,350 filed Nov. 10, 2017, by inventors Richard A. Derenne et al. and entitled POWERED PATIENT SUPPORT APPARATUS, which in turn is a continuation of U.S. patent application Ser. No. 15/004,501 filed Jan. 22, 2016, by inventors Richard A. Derenne et al. and entitled POWERED PATIENT SUPPORT APPARATUS, which is a continuation of U.S. patent application Ser. No. 13/795,193 filed Mar. 12, 2013, which claims priority to U.S. provisional patent application Ser. No. 61/702,316 filed Sep. 18, 2012, the complete disclosures of which are all hereby incorporated herein by reference.

BACKGROUND

The present disclosure relates to patient support apparatuses—such as, but not limited to, beds, stretchers, cots, operating tables, and the like—and more particularly to patient support apparatuses that have at least one powered wheel to assist in the movement of the patient support apparatus over a floor.

Patient support apparatuses are used in hospitals, nursing homes, and other healthcare facilities for both supporting patients within a room or other location, as well as transporting patients between rooms and/or other locations. While most patient support apparatuses include one or more wheels that allow the support apparatus to be wheeled from the first location to the second location, the weight and bulk of the patient support apparatus—including the weight of the patient supported thereon, can make it difficult for a caregiver to manually wheel the support apparatus from one location to another. This can be especially difficult when there are inclines in the floors of the healthcare facility, or when there are long distances involved, or when the patient and/or the support apparatus are heavy. This difficulty can be further exacerbated when it is desirable to maneuver the patient support apparatus into, or through, areas with little excess clearance, such as in elevators, rooms, or corridors, or when turning the patient support apparatus around a corner, or steering it past obstacles.

In the past, powered patient support apparatuses have been provided that include a powered wheel that is driven by a motor positioned on the patient support apparatus. One such example is shown in U.S. Pat. No. 6,752,224 issued to Hopper et al. In prior powered support apparatuses, the powered wheel responds to controls issued by a caregiver. In some instances, the caregiver controls the powered wheel by one or more handles positioned at an end of the patient support apparatus. When the caregiver pushes forward on the handle, the powered wheel powers the support apparatus forward. Conversely, when the caregiver pulls back on the handle, the powered wheel brakes or moves backward. A load cell, a potentiometer, or some other type of sensor may be used to sense the forward/backward pushing of the caregiver.

Despite the assistance of the powered wheel, prior art powered patient support apparatuses can still be difficult to use, and/or suffer from other disadvantages.

SUMMARY

Accordingly, the various aspects of the present disclosure provide powered patient support apparatuses with improved controls and/or other features that make the powered support apparatus easier to use, steer, and/or control. In some aspects, the patient support apparatus of the present disclosure provides improved movement control by providing multiple touch points that enable the caregiver to move the apparatus in multiple directions. That is, the caregiver can be positioned virtually anywhere around the perimeter of the patient support apparatus and, without having to change position vis-à-vis the support apparatus, he or she can move the support apparatus in any direction. The patient support apparatuses include motorized steerable wheels that are steered in accordance with input from a user. The motor controls the steering of one or more wheels to match the direction in which the user wishes the patient control apparatus to move. The motorized steered wheels are the same as the powered wheels that move the support apparatus in one embodiment, while they are separate from the wheels that provide motive force to the support apparatus in another embodiment. By controlling not only the powered movement of the wheels, but also the steering of the wheels, a caregiver or other person moving the support apparatus is better able to control, steer, and/or move the support apparatus in tight spaces, around corners, and/or through narrow openings.

According to one aspect of the disclosure, a patient support apparatus is provided that includes a base, wheels, at least one spherical wheel, a motor, a litter, a lift, a force sensing system, and a controller. The wheels, including the spherical wheel, are coupled to the base. The motor drives the spherical wheel. The litter includes a patient support surface for supporting a patient. The lift is coupled between the base and the litter and changes a height of the litter with respect to the base. The force sensing system detects forces exerted by a user. The controller controls the motor and drives the spherical wheel based upon forces detected by the force sensing system.

According to other aspects, the controller both steers and powers the spherical wheel based upon the forces detected by the force sensing system.

The force sensing system detects both a magnitude and a direction of a horizontal component of the forces exerted by the user, in some embodiments. When so configured, the controller steers and powers the spherical wheel based upon the magnitude and direction of the exerted forces.

The force sensing system includes a plurality of force sensors positioned at different locations on the patient support apparatus, in some embodiments. The controller steers and powers the spherical wheel based at least partially upon the locations of the force sensors relative to a reference point on the patient support apparatus. In some embodiments, the controller steers the spherical wheel based at least partially upon a difference between a force sensed by a first one of the force sensors and a force sensed by a second one of the force sensors.

In some embodiments, the force sensing system includes a plurality of force sensors mounted to a side rail.

The force sensing system, in some embodiments, is adapted to determine a location on the patient support apparatus of the exerted forces relative to a reference location on the patient support apparatus. When so configured, the controller steers and powers the spherical wheel based at least partially upon any torque generated by the exerted forces with respect to the reference location. The reference location may be the center of gravity of the patient support apparatus.

In some embodiments, the controller steers the spherical wheel in a manner that amplifies how the patient support apparatus would turn if the patient support apparatus were subjected to only forces applied at first and second ones of the sensors.

According to another aspect, a transport for a non-wheeled patient support apparatus is provided. The transporter includes a base, a plurality of wheels, a motor, a lift, a force sensing system, and a controller. The wheels are coupled to the base. The motor is adapted to drive at least one of the wheels. The lift raises the patient support apparatus out of contact with the ground. The force sensing system detects forces exerted by a user. The controller controls the motor and drives the at least one of the wheels based upon forces detected by the force sensing system. The controller also raises the lift when the transporter is positioned underneath the patient support apparatus to thereby lift the patient support apparatus out of contact with the ground, whereby the transporter is able to carry the patient support apparatus to a different location.

In some embodiments, the controller includes a pedal coupled to the transporter. The pedal raises the lift when the pedal is pressed.

The controller is releasably positionable on the patient support apparatus, in some embodiments. The controller may include a touch screen and/or it may communicate wirelessly with the transporter.

In some embodiments, the controller steers at least one of the wheels. In other embodiments, the controller steers multiple wheels of the transporter.

The lift is coupled to a section adapted to be inserted into a slot defined on an underside of the patient support apparatus, in some embodiments.

In any of the embodiments described herein, the patient support apparatus may be one of a bed, a stretcher, or a cot.

In some embodiments, the controller takes into account the torque or moment of force created by the applied forces based upon their location relative to a center point, center region, or other reference location. The responding movement of the support apparatus is to steer the support apparatus in a manner that follows or matches how the patient support apparatus would turn if it were subjected to only the applied forces. That is, the controller drives the powered wheel or wheels in a manner that generally amplifies the applied forces.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 18 is a plan view diagram of a patient support apparatus embodiment illustrating pure translation motion that may be implemented by a caregiver pushing on a side rail;

FIG. 19 is a plan view diagram of a patient support apparatus embodiment illustrating translation and rotational motion that may be implemented by a caregiver pushing and/or pulling with different forces on the ends of a side rail;

FIG. 20 is a plan view diagram of a patient support apparatus embodiment illustrating translation and rotational motion that may be implemented by multiple caregivers simultaneously pushing and/or pulling on different side rails;

FIG. 21 is a plan view diagram of a patient support apparatus embodiment illustrating Ackermann steering that may be implemented by a caregiver pushing and/or pulling on a control at an end of the patient support apparatus;

FIG. 25 is a plan view diagram of a patient support apparatus embodiment having one or more sensors allowing the patient support apparatus to automatically assist in steering so as to avoid obstacles;

FIG. 31 is a perspective view of a patient support apparatus embodiment having a retractable and extendible platform for a caregiver to ride on;

DETAILED DESCRIPTION OF THE EMBODIMENTS

Figure 1:
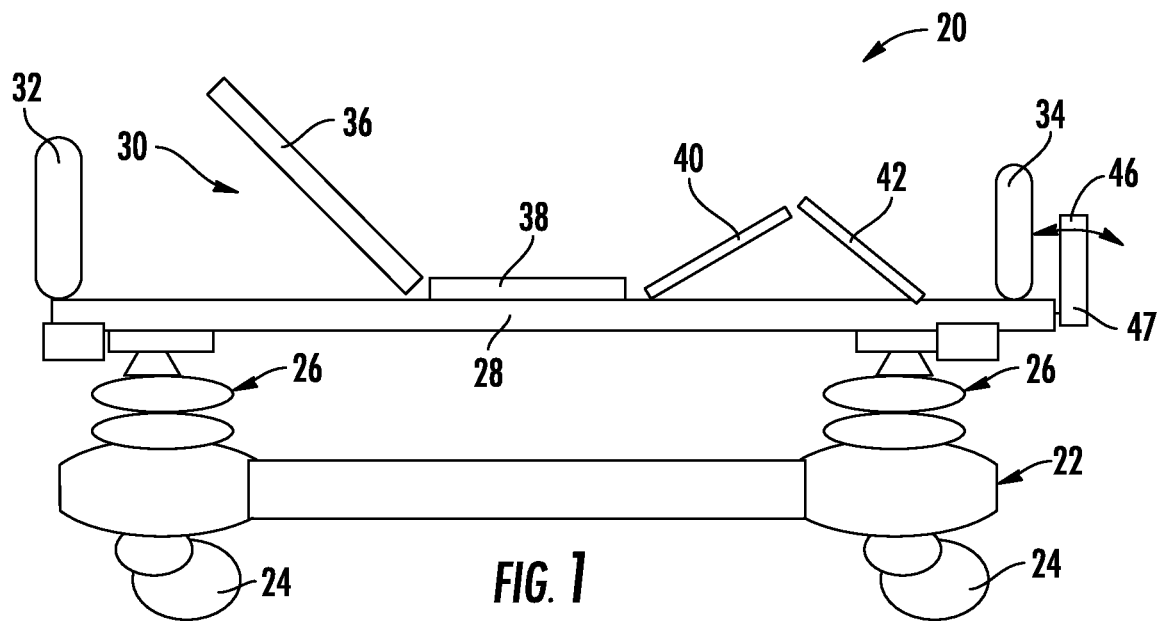
FIG. 1 is a side, elevation view of a patient support apparatus that may incorporate one or more aspects of the present disclosure.

A patient support apparatus 20 according to one embodiment is shown in FIG. 1. While the particular form of patient support apparatus 20 illustrated in FIG. 1 is a bed, it will be understood that patient support apparatus 20 could, in different embodiments, be a cot, a stretcher, a gurney, or any other structure capable of supporting a patient while being transported from one place to another.

In general, patient support apparatus 20 includes a base 22 having a plurality of wheels 24, a pair of elevation adjustment mechanisms 26 supported on the base, a frame or litter 28 supported on the elevation adjustment mechanisms, and a patient support deck 30 supported on the frame. Patient support apparatus 20 further includes a headboard 32 and a footboard 34.

Base 22 includes a brake that is adapted to selectively lock and unlock wheels 24 so that, when unlocked, patient support apparatus 20 may be wheeled to different locations. Elevation adjustment mechanisms 26 are adapted to raise and lower frame 28 with respect to base 22. Elevation adjustment mechanisms 26 may be hydraulic actuators, electric actuators, or any other suitable device for raising and lowering frame 28 with respect to base 22. In some embodiments, elevation adjustment mechanisms 26 are operable independently so that the orientation of frame 28 with respect to base 22 can also be adjusted.

Frame 28 provides a structure for supporting patient support deck 30, headboard 32, and footboard 34. Patient support deck 30 is adapted to provide a surface on which a mattress (not shown), or other soft cushion is positionable so that a patient may lie and/or sit thereon. Patient support deck 30 is made of a plurality of sections, some of which are pivotable about generally horizontal pivot axes. In the embodiment shown in FIG. 1, patient support deck 30 includes a head section 36, a seat section 38, a thigh section 40, and a foot section 42. Head section 36, which is also sometimes referred to as a Fowler section, is pivotable between a generally horizontal orientation (not shown in FIG. 1) and a plurality of raised positions (one of which is shown in FIG. 1). Thigh section 40 and foot section 42 may also be pivotable, such as is shown in FIG. 1.

A plurality of side rails 44 (FIGS. 15-17) may also be coupled to frame 28. If patient support apparatus 20 is a bed, there may be four such side rails, one positioned at a left head end of frame 28, a second positioned at a left foot end of frame 28, a third positioned at a right head end of frame 28, and a fourth positioned at a right foot end of frame 28. If patient support apparatus 20 is a stretcher or a cot, there may be fewer side rails. In other embodiments, there may be no side rails on patient support apparatus 20. Regardless of the number of side rails, such side rails are movable between a raised position in which they block ingress and egress into and out of patient support apparatus 20, and a lowered position in which they are not an obstacle to such ingress and egress.

The construction of any of base 22, elevation adjustment mechanisms 26, frame 28, patient support deck 30, headboard 32, footboard 34, and/or side rails 44 may take on any known or conventional design, such as, for example, that disclosed in commonly assigned, U.S. Pat. No. 7,690,059 issued to Lemire et al., and entitled HOSPITAL BED, the complete disclosure of which is incorporated herein by reference; or that disclosed in commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosure of which is also hereby incorporated herein by reference. The construction of any of base 22, elevation adjustment mechanisms 26, frame 28, patient support deck 30, headboard 32, footboard 34 and/or the side rails may also take on forms different from what is disclosed in the aforementioned patent and patent publication.

Patient support apparatus 20 further includes one or more handles 46 (FIG. 1) that are adapted to allow a caregiver to control powered movement of patient support apparatus 20. Handles 46 are pivotable about a generally horizontal pivot axis 47 such that a user can pivot them forwardly with a forward force and pivot them backwardly with a rearward force. This pivoting is detected by one or more potentiometers, or other sensors, and used to control the powered movement of patient support apparatus 20, as will be discussed in greater detail below. In some embodiments, handles 46 are located on or adjacent footboard 34, while in other embodiments handles 46 are located on or adjacent headboard 32.

For purposes of the description provided herein, powered movement of support apparatus 20 refers to movement of apparatus 20 in which one or more motors, or other powered devices, supply at least some of the force needed for steering and/or moving apparatus 20 over the floor. Powered movement of patient support apparatus 20 therefore reduces the amount of force a caregiver needs to exert to move the apparatus 20 from one location to another, thereby alleviating the work effort a caregiver needs to expend during patient transport. In one aspect, patient support apparatus 20 differs from prior powered patient support apparatuses in that it provides powered steering in addition to, and/or in lieu of, powered movement. The provision of powered steering further reduces the workload on a caregiver when moving apparatus 20.

In some embodiments, patient support apparatus 20 includes multiple handles 46 positioned on or adjacent footboard 34 and/or on or adjacent headboard 32. When multiple handles 46 are included, the powered steering of patient support apparatus 20 is implemented by analyzing the different amounts of force exerted by a caregiver on the multiple handles 46 and controlling the powered steering accordingly. For example, if a caregiver's left hand pushes strongly forward on a left handle 46, while a caregiver's right hand simultaneously pushes forward with a lesser force on a right handle 46, the patient support apparatus will automatically turn one or more of the wheels 24 toward the right because the caregiver's pushing forces suggest the caregiver wants to turn the support apparatus toward the right. That is, the patient support apparatus 20 steers the support apparatus generally in the same manner that it would normally turn in response to the caregiver's forces in the absence of any powered steering and/or powered movement. However, because of the inclusion of the powered movement and steering features, the amount of force required to be exerted by the caregiver to achieve the desired movement is lessened.

As will be discussed in greater detail below, the force sensors that are coupled to handles 46 may include any one or more of load sensors, potentiometers, strain gauges, capacitive sensors, piezoresistive or piezoelectric sensors, or any other types of sensors that are capable of detecting forces exerted by a caregiver. In many of the embodiments, the force sensors will be configured to detect forces exerted in two mutually orthogonal generally horizontal directions. That is, for example, the force sensors will be configured to detect exerted forces that have a component parallel to the longitudinal extent of apparatus 20 (head to foot end), as well as forces that have a component parallel to the lateral extent of the apparatus 20 (side to side). In this manner, the movement of patient support apparatus 20 can be coordinated to match or align with not only the forward to backward forces exerted on the patient support apparatus, but also horizontal forces that are transverse or oblique to the forward-backward axis of the patient support apparatus 20.

Figure 2:
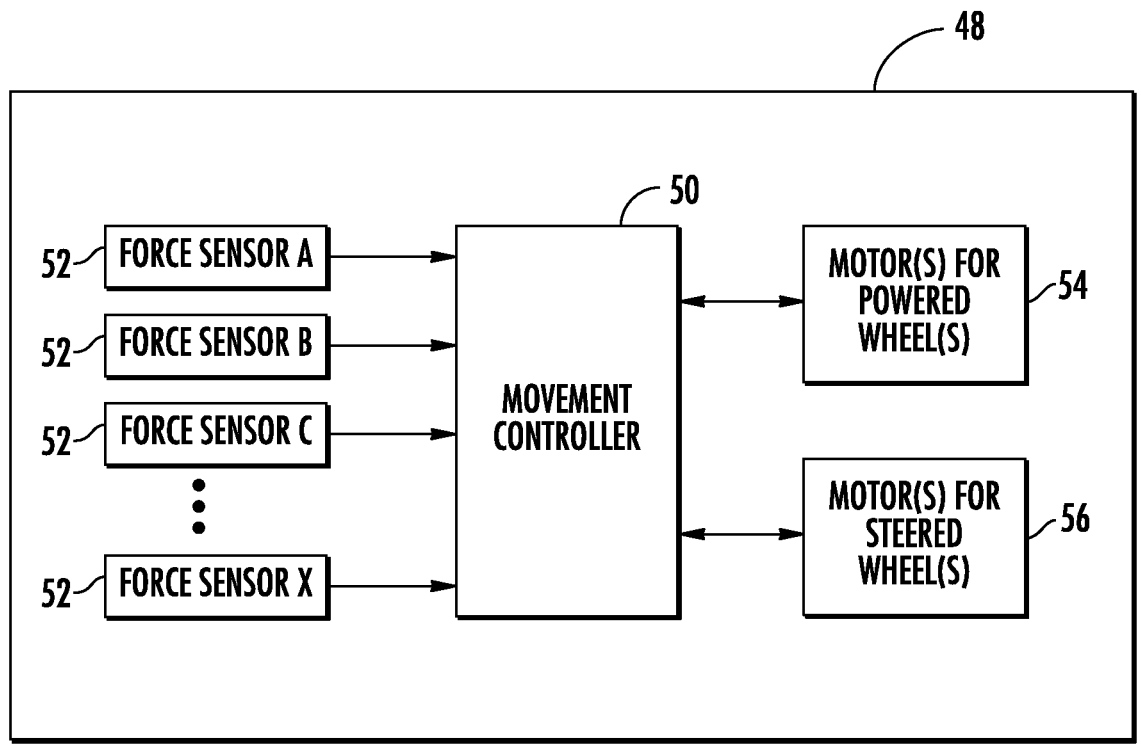
FIG. 2 is a diagram of a first example of a control system for any of the patient support apparatus embodiments of the disclosure.

FIG. 2 illustrates in diagrammatic format one embodiment of a control system 48 that is usable with any of the patient support apparatus embodiments discussed herein. Control system 48 includes a movement controller 50, a plurality of force sensors 52, one or more powered wheel motors 54, and one or more steered wheel motors 56. Movement controller 50 can take on a variety of different forms, including one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. In general, movement controller 50 coordinates both the steering and powering of one or more wheels 24 based upon information received from one or more force sensors 52, or from one or more other user inputs. More specifically, movement controller 50 receives electrical signals from the one or more force sensors 52, analyzes those signals, and outputs one or more commands to motors 54 and 56 that cause the motors to operate in a manner that helps to move patient support apparatus 20 in the direction desired by the caregiver.

Figure 15:
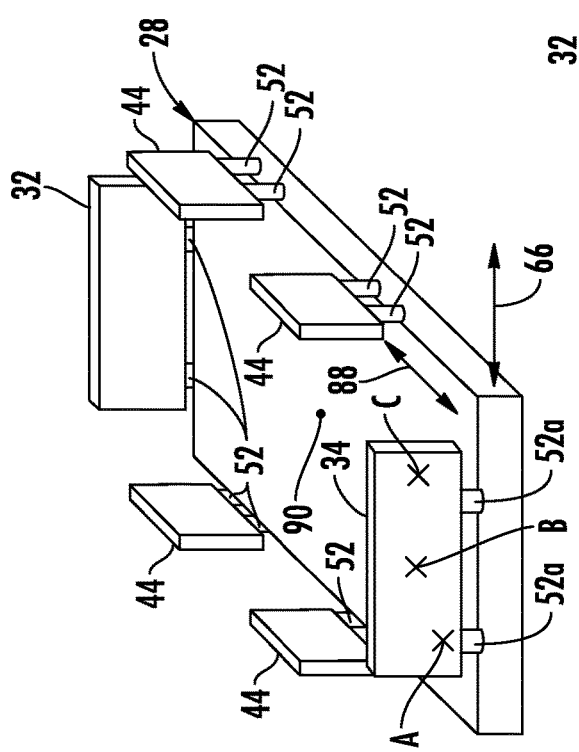
FIG. 15 is a perspective view diagram of a patient support apparatus litter illustrating force sensors that may be located at the junction of the litter and any one or more of a footboard, a headboard, and/or one or more side rails, and which may be incorporated into any of the patient support apparatus embodiments described herein.

As was noted above, force sensors 52 may include load cells, potentiometers, strain gauges, capacitive, piezoresistive or piezoelectric sensors, or any other types of sensing structures that are capable of detecting forces exerted by a caregiver thereon. Typically such force sensors 52 are arranged or configured so as to detect any and all force components that are exerted in generally any horizontal orientation, or that have any horizontal components to them. More specifically, force sensors 52 are arranged to detect forces that are generally parallel to the horizontal plane defined by frame 28 of patient support apparatus 20, or the horizontal plane defined by wheels 24 of patient support apparatus 20 (which may not be parallel to a true horizontal plane if the support apparatus 20 is positioned on an incline or decline, or other uneven ground). That is, force sensors 52 are able to detect forces in both a lateral direction 66 and a longitudinal direction 88 (FIG. 15). Force components that are vertically oriented with respect to either of these planes may, in general, be ignored or not sensed by force sensors 52, or used for other purposes besides controlling the movement of support apparatus 20 over the floor.

Force sensors 52 are able to not only detect the magnitude of forces applied, but also the direction(s) of those forces. And it will be understood by those skilled in the art, the reference to "direction" of forces herein will typically mean more than merely determining whether a force was applied in a forward or backward direction. Rather, force sensors 52 are capable of determining the direction of applied force in generally all horizontal, or approximately horizontal, directions. That is, force sensors 52 can detect any angular orientation, from zero to three-hundred and sixty degrees, about a generally vertical axis, allowing the support apparatus 20 greater movement flexibility in that it can be guided in more than just forward-reverse directions, but also many other directions as well.

Movement controller 50 is programmed, or otherwise configured, to control powered wheel motors 54 and steered wheel motors 56 such that the wheels move in a manner based upon both the direction and magnitude of forces exerted by a caregiver on the patient support apparatus 20, as detected by force sensors 52. That is, movement controller generally steers the wheels to either match the direction of the force or forces exerted by a caregiver on force sensors 52, or rotates the support apparatus 20 in a manner that corresponds to the torque on support apparatus 20 that is created by the location of the applied force. Movement controller also powers the powered wheels in a manner that is at least somewhat related to the magnitude of the detected force or forces. The relationship between the magnitude of power supplied to the wheels and the magnitude of the detected forces may, in some embodiments, be a direct relationship, but also may be more nuanced than a simple direct relationship. For example, in some embodiments, movement controller 50 supplies power to the powered wheels in increments, rather than a continuous fashion. In still other embodiments, where multiple force sensors 52 are detecting forces, the magnitudes of the detected forces is used in determining steering, and the power supplied to the wheels is completely or partially independent from the force magnitudes. For example, in some embodiments, if two forces are applied to two different sensors 52 with different magnitudes (or with different directions), the different magnitudes are interpreted by movement controller 50 to be indicating that the caregiver wants to turn the patient support apparatus. In such cases, the detected force magnitudes influence steering commands issued by movement controller 50 more so, or as much as, the speed commands or power commands issued by movement controller 50 to powered wheel motor(s) 54.

Figure 3:
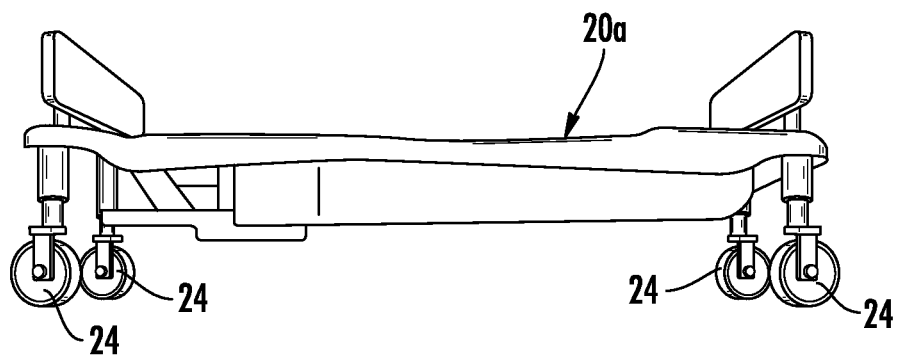
FIG. 3 is side, elevation view of another patient support apparatus incorporating aspects of the present disclosure.
Figure 4:
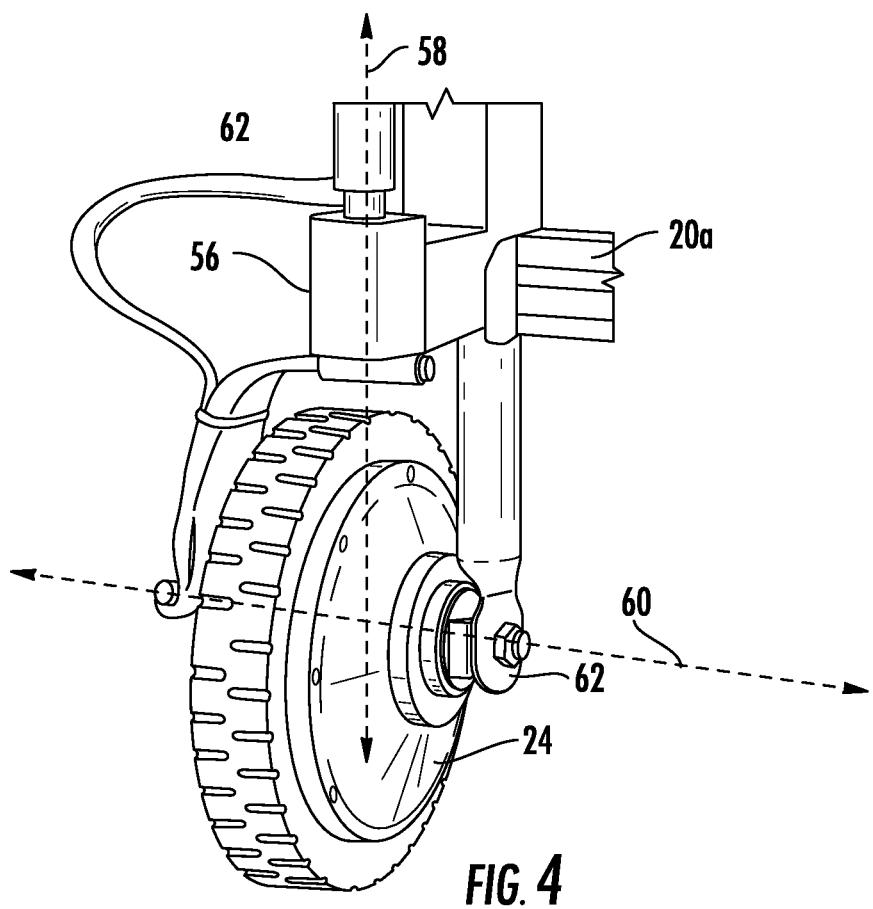
FIG. 4 is a close-up view of one of the wheels of the support apparatus of FIG. 3.

FIGS. 3 and 4 illustrate an example of a patient support apparatus 20a having different motors used for steering and for moving the apparatus 20a. As shown in FIG. 3, patient support apparatus 20a includes four wheels 24, which are each generally positioned adjacent the four corners of apparatus 20a. In this embodiment, each wheel 24 is both steerable and powered. FIG. 4 illustrates a close-up view of one of the wheels 24 of FIG. 3. As can be seen, apparatus 20a includes a steering motor 56 positioned generally above its corresponding wheel 24. Steering motor 56 is configured to rotate wheel 24 about a generally vertical axis 58 based upon commands received from movement controller 50. Wheel 24 of FIG. 4 further includes a power motor 54 that is located inside of wheel 24 and that is configured to cause wheel 24 to rotate about a generally horizontal rotational axis 60. Power motor 54 gets its commands and/or electrical power through a pair of cables 62 that connect thereto. Power motor 54 rotates wheel 24 about axis 60 based upon speed or power commands issued from movement controller 50. Each wheel 24 of patient support apparatus 20a includes a corresponding power motor 54 and a steering motor 56. It will be understood, as described in greater detail below, that different embodiments of patient support apparatus 20 have different arrangements and combinations of steerable and powered wheels.

FIGS. 5-13 illustrate a variety of different wheel configurations that are able to be implemented in any of the patient support apparatus embodiments disclosed herein. In the various embodiments depicted in these figures, wheels 24 that are powered (such as by a motor 54) will be given the reference number 24a; wheels that are steered (such as by a motor 56) will be given the reference number 24b; wheels that are both steered and powered will be given the reference number 24c; and wheels that are neither driven nor steered will be given the reference number 24d. In some instances, powered wheels 24a are alternatively referred to as driven wheels 24a. It will be understood that the embodiments depicted in FIGS. 5-13 are only several of many possible wheel configurations that may be implemented, and that the location and combination of powered and steered wheels can be modified from the examples shown herein. It will also be understood that, for each of the embodiments shown in FIGS. 5-13, movement controller 50 will control the wheels 24a, 24b, and/or 24c based upon signals received from one or more force sensors 52, which are not shown in any of FIGS. 5-13. The potential location of force sensors 52 are described in more detail with respect to FIGS. 15-17.

Figure 5:
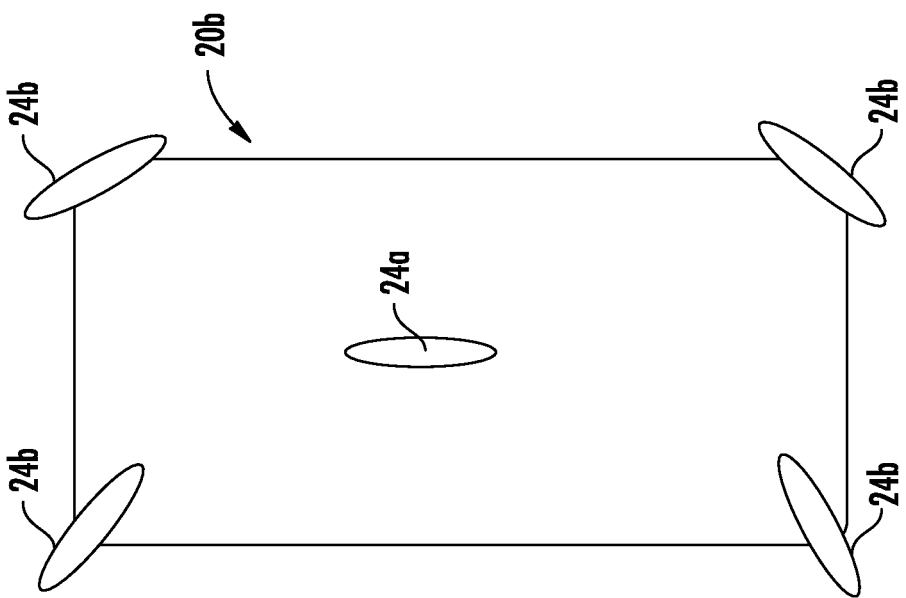
FIG. 5 is a plan view diagram of a first wheel configuration that may be incorporated into any of the patient support apparatus embodiments described herein.

FIG. 5 illustrates a plan view diagram of a patient support apparatus 20b that includes four steered wheels 24b positioned generally adjacent each corner of patient support apparatus 20b. In this embodiment, each steered wheel 24b is steerable independently of the other three wheels 24b. Such independent steering is accomplished by providing four steering motors 56 on patient support apparatus 20b—one for each wheel 24b—or through other means. By providing independent steering of each wheel, patient support apparatus 20b may be rotated in smaller spaces than a support apparatus that had fewer steered wheels. A powered wheel 24a is also provided in patient support apparatus 20b and located generally near the center of the footprint of patient support apparatus 20b, although it may be offset somewhat toward either the front or rear ends of apparatus 20b. Powered wheel 24a receives power from a motor 54 that drives the wheel 24a either forward or backward. In this embodiment, powered wheel 24a is not steerable, but instead only drives support apparatus 20b either forward or backward, leaving wheels 24b to handle the steering.

Figure 6:
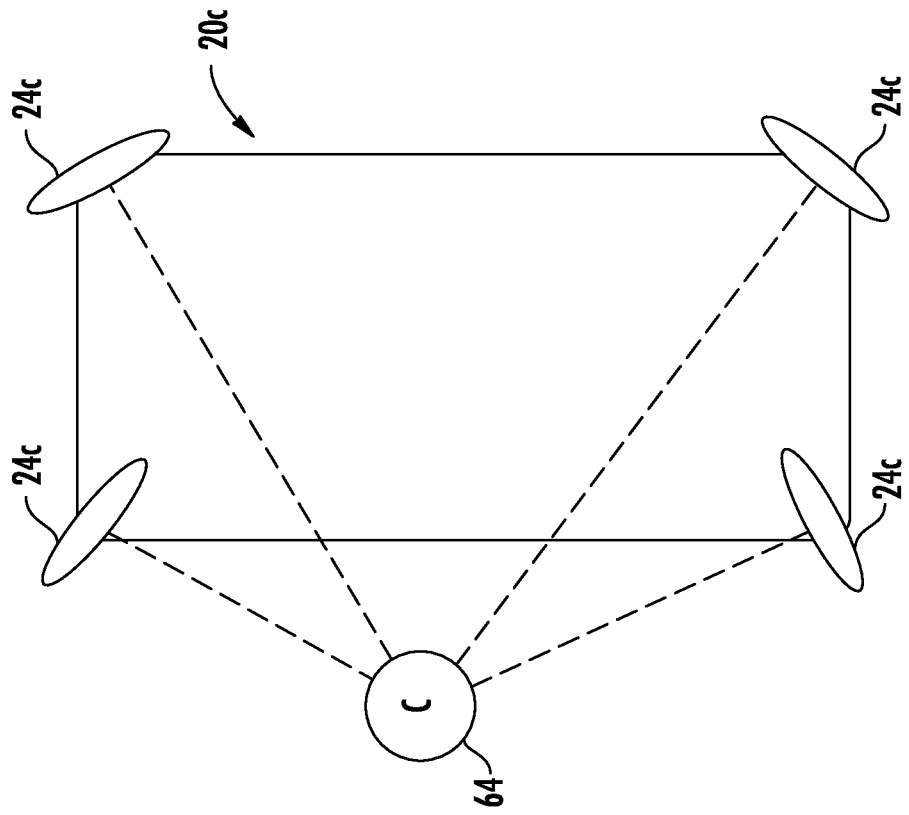
FIG. 6 is a plan view diagram of a second wheel configuration that may be incorporated into any of the patient support apparatus embodiments described herein.

FIG. 6 illustrates a plan view diagram of another embodiment of a patient support apparatus 20c that includes four steered and powered wheels 24c. Wheels 24c are located generally near each corner of patient support apparatus 20c, although, as with patient support apparatus 20b, these locations can be varied. Each of the wheels 24c is both drivable and steerable independently from the other three wheels 24c. In the configuration shown in FIG. 6, patient support apparatus 20c has its wheels 24c turned so that it can rotate about a center of rotation 64 that is positioned outside of the footprint of patient support apparatus 20c. Patient support apparatus 20c includes four separate steering motors 56 and four separate driving motors 54 to achieve the independent steering and powering of each wheel 24c. In some embodiments, however, the driving and steering of wheels 24c could be modified to be less independent. For example, the front wheels 24c could be driven as a pair (with the same power level) while the rear wheels 24c could be driven as a separate pair (with the same power level as each other, but not necessarily the same power level as the front wheels 24c). Other configurations of less independent powering are also possible. Still further, some wheels could be steered in tandem, or in other dependent configurations.

Figure 7:
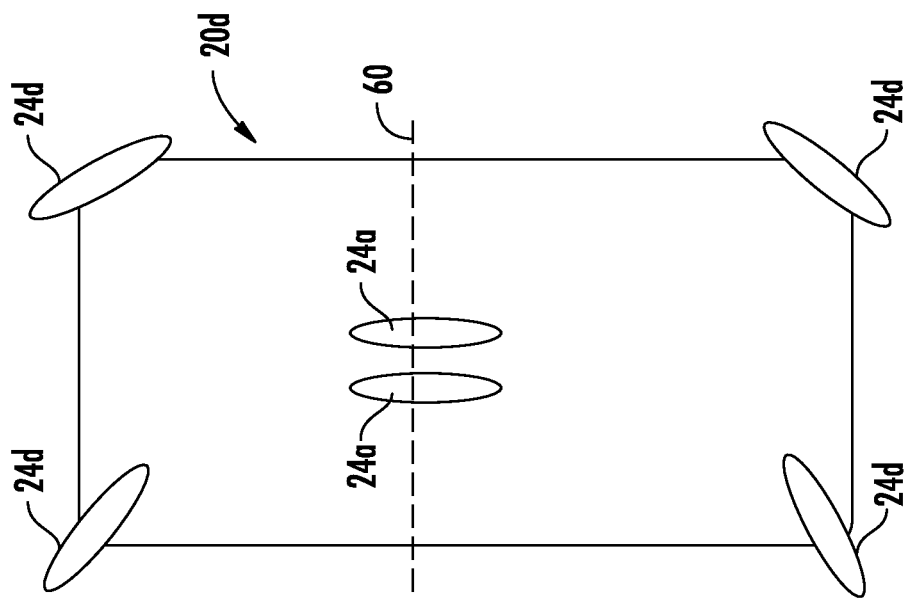
FIG. 7 is a plan view diagram of a third wheel configuration that may be incorporated into any of the patient support apparatus embodiments described herein.

FIG. 7 illustrates a plan view diagram of another embodiment of a patient support apparatus 20d that includes two driven wheels 24a and four wheels 24d that are neither driven nor steered. Non-driven and non-steered wheels 24d may be caster wheels, or other freewheeling types of wheels. Patient support apparatus 20d is configured to move forward or backward by supplying equal power to both driven wheels 24a. Patient support apparatus 20d is further configured to provide steering assistance by rotating one of wheels 24a at a different rate than, or by applying a different amount of power to, the other of wheels 24a. This difference in power or rotation rate exerts a turning force on support apparatus 20d that can be controlled by movement controller 50 based upon signals received from force sensors 52. In the embodiment shown in FIG. 7, wheels 24 are arranged side-by-side so that their respective rotational axes 60 are generally coaxial. It will be understood by those skilled in the art that the differential steering of patient support apparatus 20d can be implemented with different powered wheel arrangements, including arrangements in which wheels 24a are not coaxial.

Figure 8:
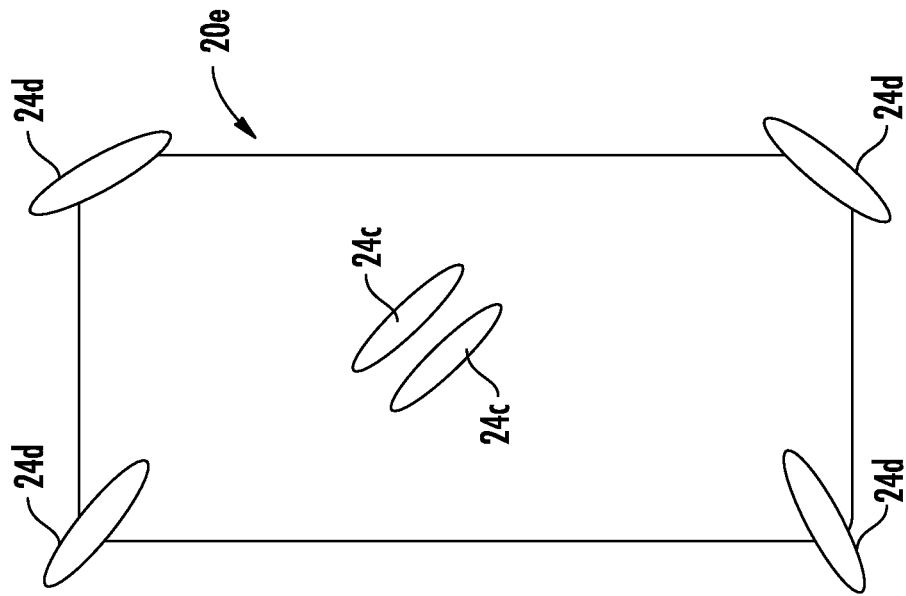
FIG. 8 is a plan view diagram of a fourth wheel configuration that may be incorporated into any of the patient support apparatus embodiments described herein.

FIG. 8 illustrates a plan view diagram of another embodiment of a patient support apparatus 20e. Patient support apparatus 20e differs from patient support apparatus 20d in that the two driven wheels 24a have been replaced by two steered and driven wheels 24c. Thus, patient support apparatus 20e is not differentially steered, as support 20d is, but instead has its steering controlled by rotating wheels 24c about their respective generally vertical axes 60, or about a common generally vertical axis. As with non-steered and non-driven wheels 24d of patient support apparatus 20d, wheels 24d of apparatus 20e are casters or otherwise free-wheeling wheels that rotate to match the current direction of movement.

Figure 9:
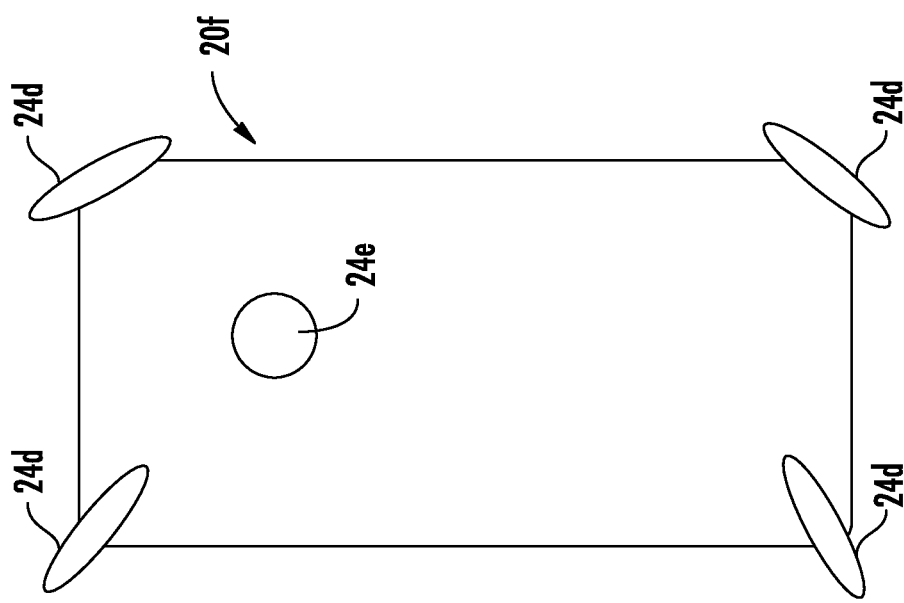
FIG. 9 is a plan view diagram of a fifth wheel configuration that may be incorporated into any of the patient support apparatus embodiments described herein.

FIG. 9 illustrates a plan view diagram of another embodiment of a patient support apparatus 20f. Patient support apparatus 20f includes four non-driven and non-steered wheels 24d, as well as a spherical wheel 24e. Spherical wheel 24e is shaped as a sphere and is controlled to roll in any desired direction. Further, spherical wheel 24e is driven in a controlled manner. Spherical wheel 24e therefore provides both a motive force for moving support apparatus 20f and control over the direction in which that motive force is applied to support apparatus 20f. In one embodiment, spherical wheel 24e may be of the kind disclosed in U.S. patent publication 2008/0084175 filed by Hollis and entitled Dynamic Balancing Mobile Robot. In this '175 patent publication, the spherical wheel is identified by the reference numeral 9. Other types of spherical wheels may also be used.

Figure 10:
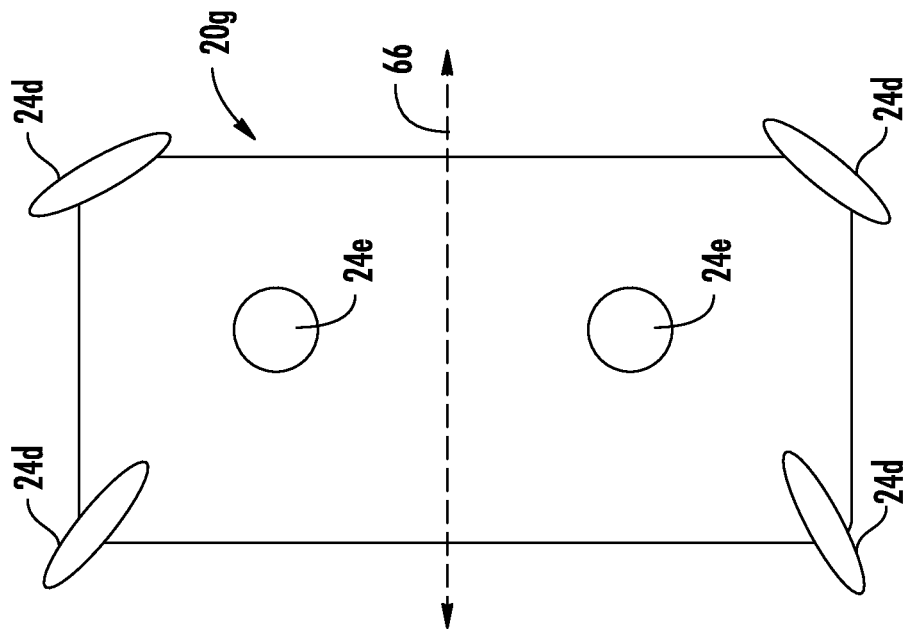
FIG. 10 is a plan view diagram of a sixth wheel configuration that may be incorporated into any of the patient support apparatus embodiments described herein.

FIG. 10 illustrates a plan view diagram of another embodiment of a patient support apparatus 20g. Patient support apparatus 20g differs from patient support apparatus 20f in that it includes a plurality of spherical wheels 24e. Spherical wheels 24e of support apparatus 20g may be the same type of spherical wheels discussed above with respect to patient support apparatus 20f. In at least one of the embodiments of patient support apparatus 20g, both wheels 24e are independently controllable with respect to both direction and with respect to the power or driving force that each exerts. By having a plurality of such wheels 24e, patient support apparatus 20f can offer greater or better movement capabilities than support apparatus 20f. For example, by rotating spherical wheels 24e simultaneously in a lateral direction 66, it is possible to move patient support apparatus 20g laterally without rotation. Further, by rotating spherical wheels 24e in opposite lateral directions (e.g. one wheel 24e rotates parallel to direction 66 and towards the right in FIG. 10 and the other wheel 24e rotates parallel to direction 66 and towards the left in FIG. 10), it is possible to rotate patient support apparatus 20g about a center of rotation that is midway between the spherical wheels 24e. Further, by controlling the rates or rotation, the location of the center of rotation 64 can be varied.

Figure 11:
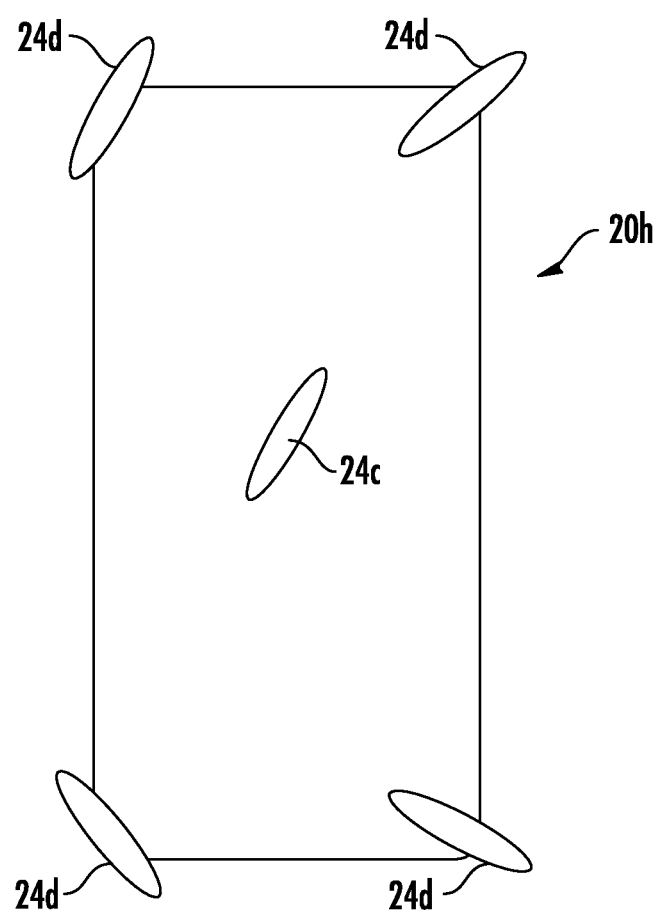
FIG. 11 is a plan view diagram of a seventh wheel configuration that may be incorporated into any of the patient support apparatus embodiments described herein.

FIG. 11 illustrates a plan view diagram of another embodiment of a patient support apparatus 20h. Patient support apparatus 20h includes four non-steered and non-driven wheels 24d positioned adjacent each of the four corners of support apparatus 20h. Support apparatus 20h further includes a driven and steered wheel 24c that is positioned generally near the center of support apparatus 20h. By controlling the driving power supplied to wheel 24c, as well as the direction it is pointed in, movement controller 50 can steer and move patient support apparatus 20h in a variety of different manners, including rotation and translational movement.

Figure 12:
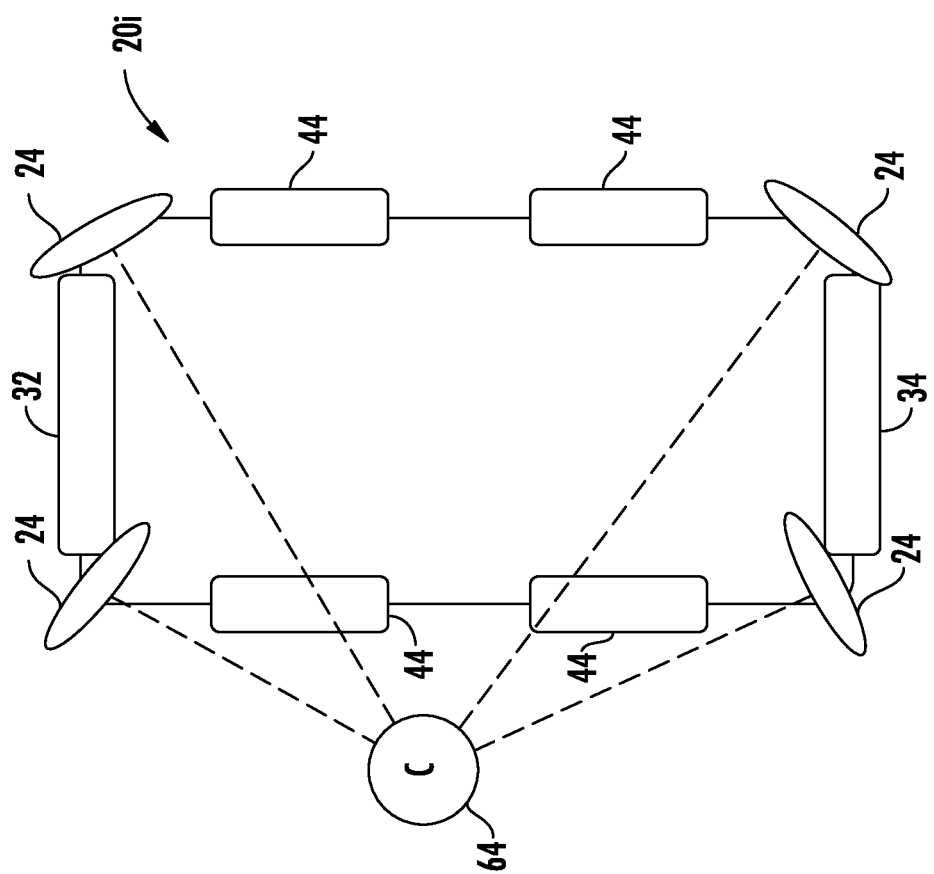
FIG. 12 is a plan view diagram of a wheel configuration illustrating some wheels being steered in opposite directions to other wheels, and which may be incorporated into any of the patient support apparatus embodiments described herein.

FIG. 12 illustrates a plan view diagram of another embodiment of a patient support apparatus 20i, showing some additional structural details of the support apparatus, including, for example, the side rails 44 and headboard and footboard 32 and 34. The inclusion of these side rails and head and foot boards in these drawings is in no way intended to suggest that these components are, or should be, absent from the embodiments depicted in FIGS. 5-11, or in any of the other embodiments that omit these elements. Instead, these components have merely been added to provide additional graphical information about several structures that may be included in the various embodiments of the patient support apparatuses described herein.

In the embodiment depicted in FIG. 12, patient support apparatus 20i shows four wheels 24 that have been rotated to give the support apparatus 20i a center of rotation 64 that is located approximately midway between headboard 32 and footboard 34. The wheels 24 in FIG. 12 have been given the generic reference number 24 because they are able take on multiple different forms. That is, in one embodiment, they are both driven and steered (e.g. wheels 24c), while in at least one other embodiment, they are steered but not driven (e.g. wheels 24b). When steered, they are configured to allow movement controller 50 to control the steering of each one of them independently of the steering of the other three wheels.

Figure 13:
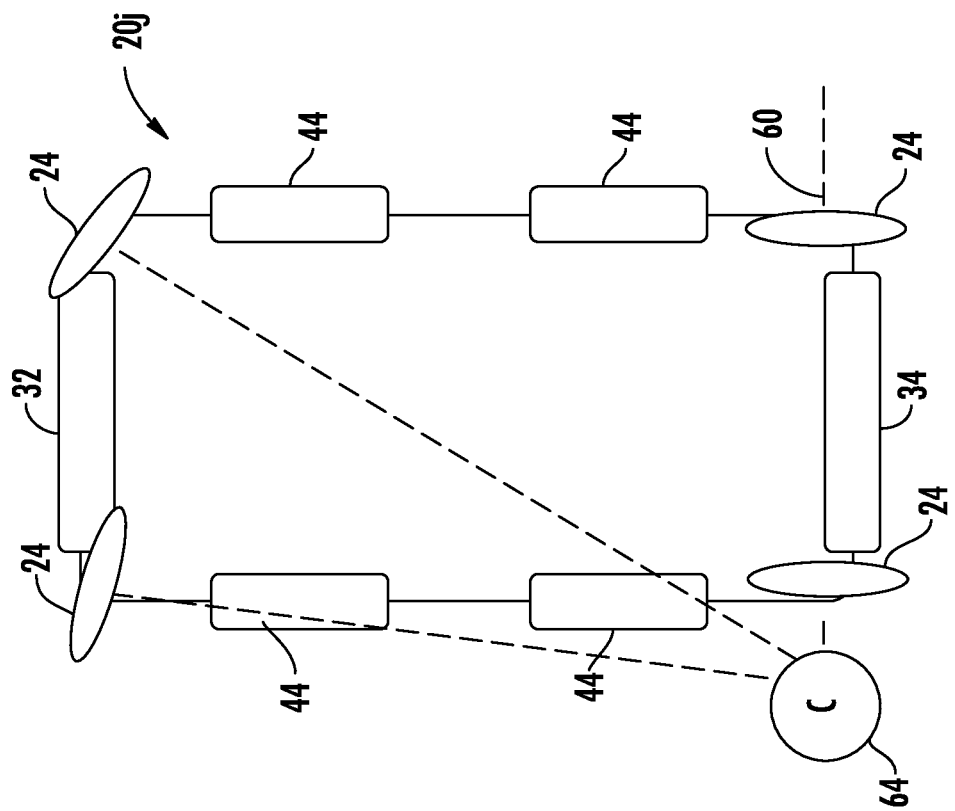
FIG. 13 is a plan view diagram of a wheel configuration illustrating an Ackermann steering configuration which may be incorporated into any of the patient support apparatus embodiments described herein.

FIG. 13 illustrates a plan view diagram of another embodiment of a patient support apparatus 20j, showing the same additional structural details as patient support apparatus 20i. As with patient support apparatus 20i, the inclusion of the side rails, head, and foot boards in this drawing is in no way intended to suggest that these components are, or should be, absent from the any of the other embodiments discussed or shown herein.

Patient support apparatus 20j of FIG. 13 is configured to implement Ackermann steering. In this configuration, the two rear wheels are not only non-steered, but they are fixedly attached to base 22 of support apparatus 20j in a manner that prevents them from turning about generally vertical axis 58, whether freely or by way of a steering motor 56. In other words, the two rear wheels 24 are fixed similar to the two rear wheels of a conventional automobile. The two front wheels 24, in contrast, are both steerable. Further, they are steerable in a manner that enables them to trace out circles of different radii, thereby enabling them to avoid, or at least reduce, any side slippage when turning. This Ackermann steering is controlled by movement controller 50. In some embodiments, each front wheel 24 is controlled independently with no mechanical linkage, while in other embodiments a mechanical linkage is coupled between the two front wheels 24 so that their steering is mechanically coordinated. When mechanically coordinated, movement controller 50 is configured to control only a single actuator that controls the mechanical linkage, whereas when no mechanical linkage is included, movement controller 50 controls two separate actuators or motors for independently steering the front wheels 24.

Figure 14:
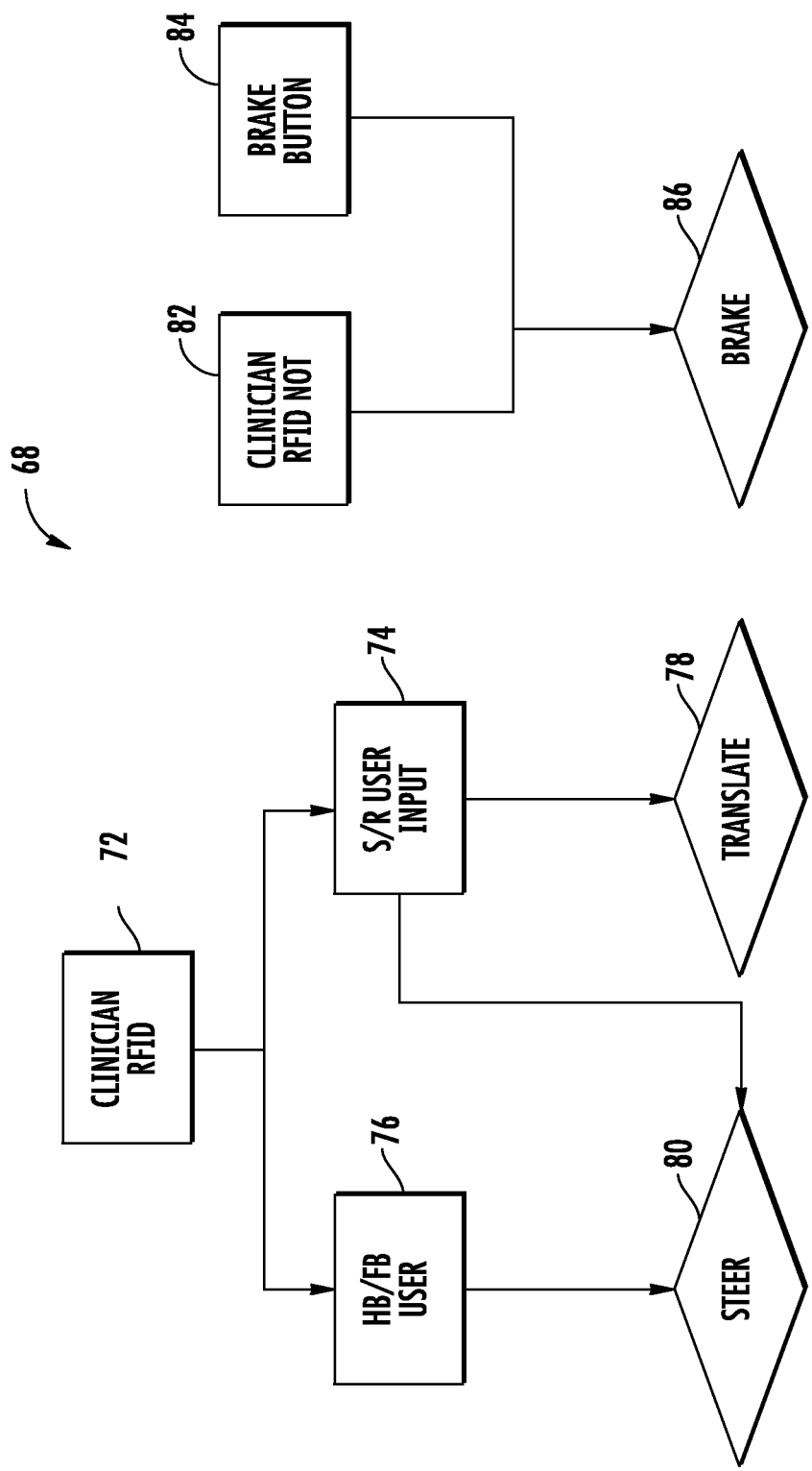
FIG. 14 is a flow diagram of control logic that may be followed by a controller incorporated into any of the patient support apparatus embodiments described herein.

FIG. 14 illustrates one example of an activation algorithm 68 used to activate or deactivate (i.e. turn on and off) the powered movement of any of the patient support apparatus embodiments disclosed herein. That is, activation algorithm controls whether or not one or more user inputs (which may be force sensors 52) will cause movement controller 50 to control one or more of either driving motors 54 or steering motors 56. When not activated, a user's manipulation of the force sensors 52, or other types of user inputs, will not result in any operation of motors 54 and 56. When activated, a users manipulation of force sensors 52 will cause movement controller 50 to activate one or more of motors 54 and 56 in a manner that is dependent upon the specific user input signals that are received.

In the embodiment illustrated in FIG. 14, activation algorithm 68 is partially dependent upon the presence or absence of a radio frequency (RF) identification (ID) tag worn by a clinician, or other authorized caregiver. Such RF ID tags are conventional RF ID tags that communicate with corresponding detectors or sensors when the RF ID tag is positioned within a specific vicinity of the detector or sensor. In this case, patient support apparatus 20 includes an RF ID sensor 70 (FIG. 35) that senses any authorized RF ID tags that are within a vicinity of the support apparatus 20. The vicinity boundaries may vary, but in general may be configured to only detect RF ID tags that are within the same room as patient support apparatus 20, or within a section of the same room. On some occasions, the sensor 70 may detect RF ID tags that are outside the room if they are positioned close to the doorway, but in general it is desirable to not detect tags outside of the same room or area that patient support apparatus 20 is currently located in.

If activation algorithm 68 detects the presence of an RF ID tag, then control will transition to step 72. At step 72, patient support apparatus 20 monitors whether or not any user inputs are detected at either the side rails 44 of support apparatus 20, or at one of the ends of support apparatus 20 (e.g. at headboard 32 or footboard 34). If user inputs are detected at one or more of side rails 44, control passes to step 74. If user inputs are detected at either or both of headboard 32 and footboard 34, then control passes to step 76. When the control transitions to step 74, movement controller 50 will respond to detected user inputs from the side rails 44 by either implementing a translation step 78 or a steering step 80, or both, depending upon what specific inputs are detected at the side rail. If user inputs are detected only at one or both of the headboard 32 and/or footboard 34 (but not the side rails 44), then movement controller 50 will respond exclusively with steering step 80.

Translation step 78 involves controlling either or both of driving motors 54 and steering motors 56 in a manner that enables support apparatus 20 to move in lateral direction 66 without any rotation. Steering step 80 involves controller either or both of driving motors 54 and steering motors 56 in a manner that will cause at least some rotation of support apparatus 20 about a generally vertical axis. Activation algorithm 68 will therefore allow only steering control when users are manipulating controls at either the head end or foot end of patient support apparatus 20, but will allow both steering and translational control when a user is manipulating controls at one or more side rails 44.

If activation algorithm 68 does not detect the presence of an RF ID tag within close proximity to patient support apparatus 20, then control transitions to state or step 82.

State 82 is one of two states that will activate a brake on patient support apparatus. The other state is state 84, in which a user has pressed a brake button on patient support apparatus 20, or otherwise turned such a brake on. Thus, in activation algorithm 68, the brake will be activated (i.e. control will pass to braking step 86) if either no RF ID tag is detected within close proximity of support apparatus 20, or the brake is actively turned on by a user. When the brake is turned on, both motors 54 and 56 remain off.

In the illustrated embodiment, the steps of activation algorithm 68 are carried out by movement controller 50, either alone or in combination with other components of support apparatus 20. In other embodiments, activation algorithm 68 may be carried out by other controllers on support apparatus 20. It will be understood by those skilled in the art that many modifications to activation algorithm 68 may be made. For example, in one embodiment, the activation or de-activation of powered movement is controlled without any detection or regard to RF ID tags, or other types of tags worn by caregivers. In such an embodiment, patient support apparatus 20 includes a switch, button, or other control that, when activated, allows for powered movement to take place in response to the manipulation of the corresponding user inputs (e.g. force sensors 52). Such a switch, button, or other control may include a security feature, such as a code that needs to be entered, or other structure that reduces the possibility of inadvertent or unknowing powering of wheels 24 by individuals who had not intended to move patient support apparatus 20. Alternatively, powered movement of patient support apparatus 20 may automatically be enabled whenever the brake on support apparatus 20 is turned off, and automatically disabled whenever the brake is turned on. Still other variations are possible.

Figure 16:
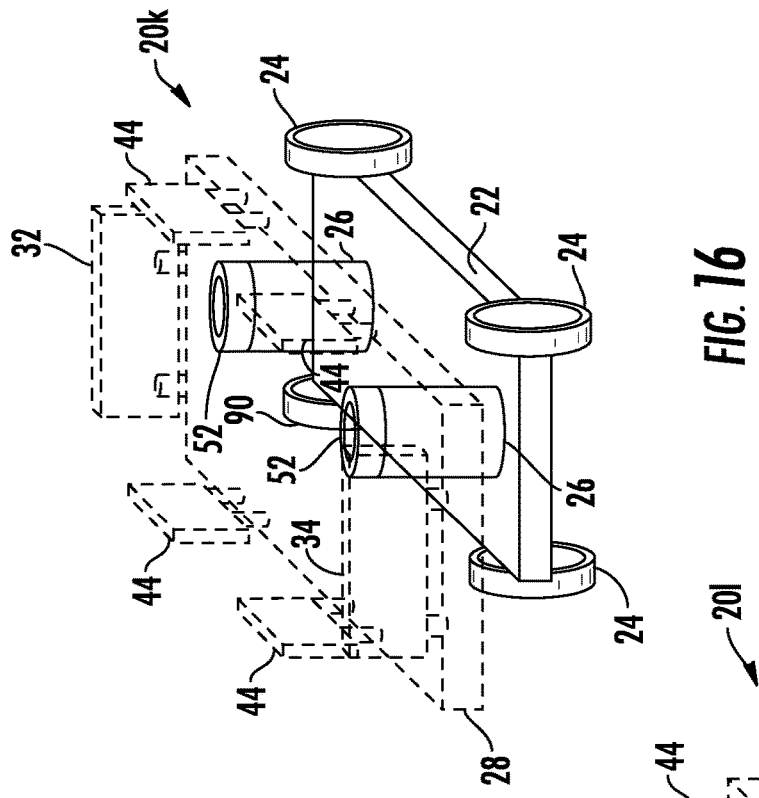
FIG. 16 is a perspective view diagram of a patient support apparatus illustrating force sensors that may be located at the junction of the litter and one or more height adjustment mechanisms for raising and lowering the litter, and which may be incorporated into any of the patient support apparatus embodiments described herein.
Figure 17:
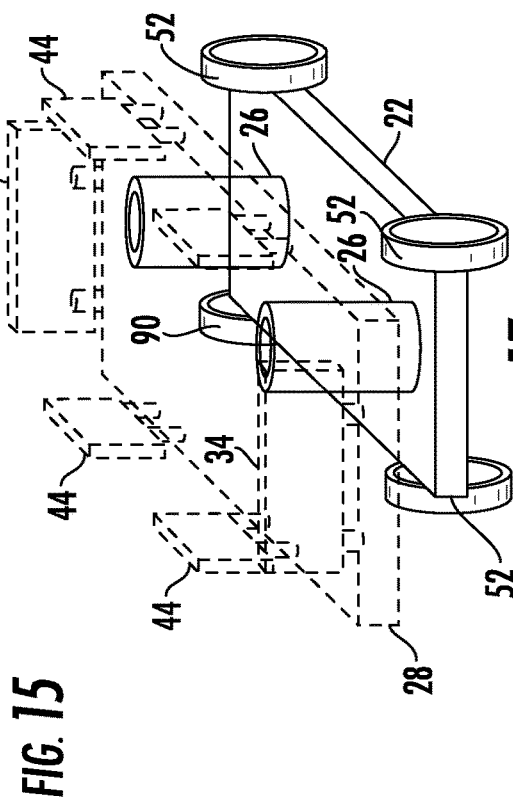
FIG. 17 is a perspective view diagram of a patient support apparatus illustrating force sensors that may be located at the junction of the wheels and wheel mounts, and which may be incorporated into any of the patient support apparatus embodiments described herein.

FIGS. 15-17 provide several illustrative examples of different configurations and locations of force sensors 52. It will be understood that the several examples illustrated in these drawings are not exhaustive, and that variations from these configurations may be made. It will be further understood that the configurations shown in these drawings, and the modifications thereof, may be incorporated into any of the various patient support apparatuses 20 that are described herein. For example, the force sensor configuration shown in FIG. 15 could be implemented on a patient support apparatus 20 having any of the wheel arrangements shown in FIGS. 3-13. Similarly, the force sensors arrangements of FIGS. 16 and 17 could also be implemented on a patient support apparatus 20 having any of the wheel arrangements of FIGS. 3-13. Further, the activation and deactivation of any of the force sensor configurations of FIGS. 15-17 could be controlled by activation algorithm 68, modifications to algorithm 68, or in still other manners.

FIG. 15 shows a frame or litter 28 of a patient support apparatus 20, as well as several side rails 44 that are attached thereto. Still further, FIG. 15 shows a headboard 32 and a footboard 34 that are attached to frame 28. Headboard 32, footboard 34, and side rails 44 will collectively be referred to herein as patient boundary structures. In the example shown in FIG. 15, each patient boundary structure is coupled to frame 28 by a pair of force sensors 52. In some embodiments, force sensors 52 provide the physical coupling of the patient boundary structures to frame 28, while in other embodiments force sensors 52 are coupled to one or more separate structures that actually physically secure the patient boundary structures to frame 28. However arranged, force sensors 52 are coupled in a manner so that forces exerted by a caregiver or other user on any of the patient boundary structures are detected by one or both of the force sensors 52 that are positioned at the junction of that patient boundary structure and the frame 28. Thus, for example, if a user presses or pulls anywhere on footboard 34, including, but not limited to any one or more of locations A, B, and/or C, this pressing or pulling force will be detected by the force sensors 52a positioned at the junction of footboard 34 and frame 28. Further, any or all of force sensors 52 (including force sensors 52a) may be constructed so as to be able to detect forces exerted both in a longitudinal direction 88 as well as a lateral direction 66, although this is not necessary.

Figure 35:
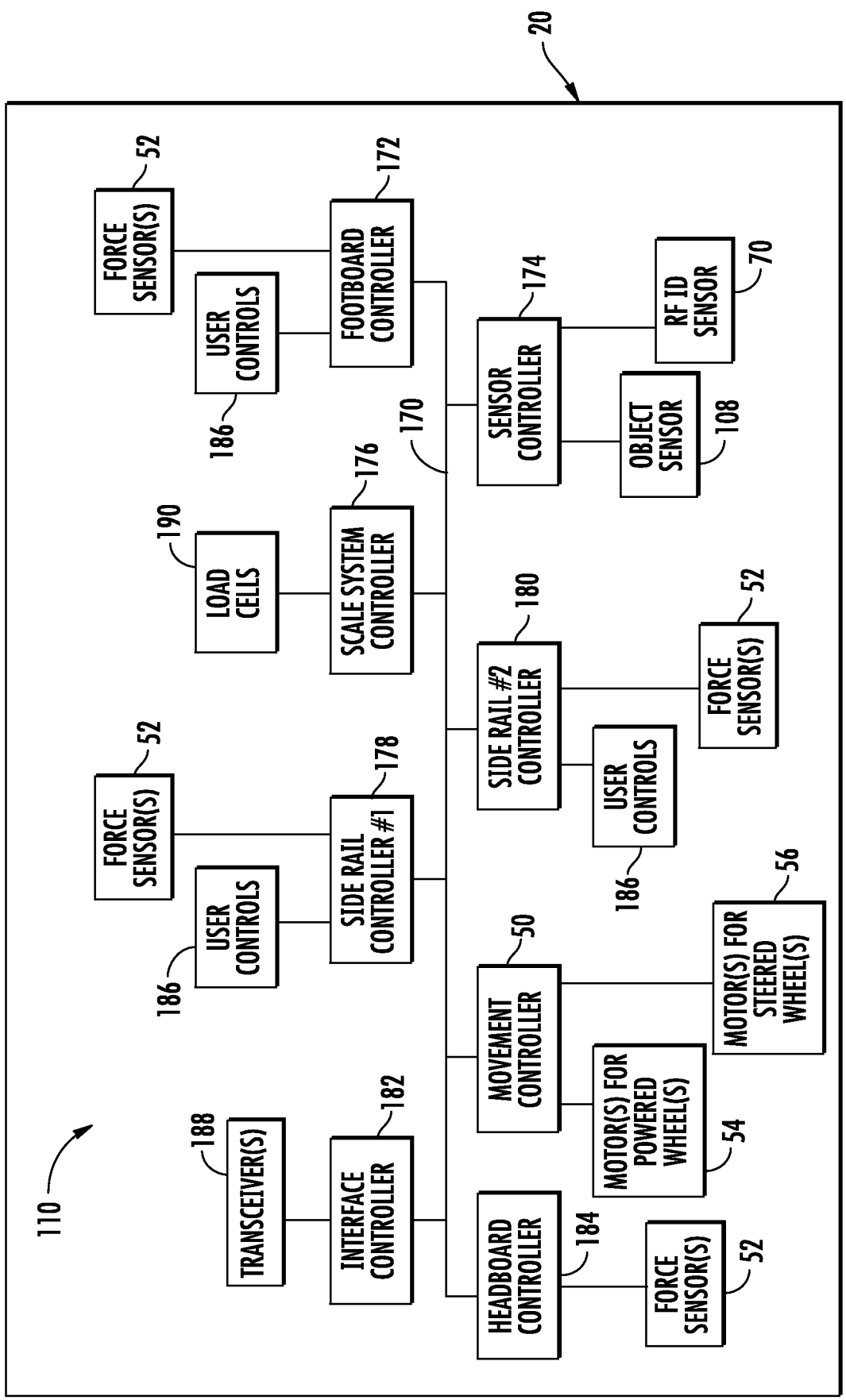
FIG. 35 is a diagram of a second example of a control system for any of the patient support apparatus embodiments of the disclosure.

Each of the force sensors 52 and 52a in FIG. 15 are electrically coupled to movement controller 50. This electrical coupling is direct, as shown in control system 48 of FIG. 2, although it may be indirect, such as through an embedded network, one example of which is shown in FIG. 35. However the force sensor readings are delivered to controller 50, controller 50 processes those readings and outputs appropriate steering and/or drive commands to motors 54 and/or 56 (assuming activation algorithm 68, or some other activation mechanism, has activated the powered movement feature of the support apparatus 20). In some embodiments, movement controller 50 control motors 54 and/or 56 so that patient support apparatus 20 moves in a direction that generally corresponds to how the patient support apparatus 20 would move in reaction to the applied forces if it were supported on frictionless or near-frictionless ground-contacting spherical wheels, and it will move with a speed or acceleration that generally corresponds to the magnitude of the sensed forces. In other words, movement controller 50 attempts to control motors 54 and 56 so as to mimic, but amplify, the motion of patient support apparatus 20 that would naturally occur as the result of the applied forces. In this manner, the direction and magnitude of the user's applied forces determine the movement of the support apparatus 20, but the motors 54 and/or 56 supply all or a substantial portion of the energy needed to effectuate that movement so that the user's work effort is reduced.

In amplifying the natural movement that would result from the forces exerted by the caregiver, movement controller 50 takes into account not only the direction and magnitude of forces applies to each force sensor 52, but also the relative location of each force sensor 52 that is sensing a force. These relative positions are defined with respect to a reference location that is chosen by the manufacturer of the patient support apparatus. In some embodiments, the reference location is the geometrical center of the patient support apparatus 20, while in other embodiments the reference location is a vertical axis aligned with the center of gravity or center of mass of patient support apparatus 20, while in still other embodiments, some other reference position is used.

Thus, for example, if a user pushes forward on footboard 34 only at position C, most of this force will be sensed by the right force sensor 52a (as shown in FIG. 15). A small amount of this forward force will also be detected by left force sensor 52a, depending upon the construction of footboard 34 and its connection to frame 28, (or even a backward force may be detected on left force sensor 52a depending upon the location of a possible pivot point of footboard 34). Regardless of what the left force sensor 52a detects, however, because the predominant force will be sensed in a forward direction at a location that is located to the right of a center 90 of patient support apparatus 20, movement controller 50 will control wheels 24 in such a manner so as to begin to turn support apparatus 20 leftward (as viewed in FIG. 15). This is because a forward force applied at location C that was greater than any forward force applied at any location on footboard 34 to the left of center point 90 would naturally (i.e. without the use of motors 54 and/or 56) tend to turn support apparatus leftward. Thus, movement controller 50 takes into account not only the direction and magnitudes of forces sensed by force sensors 52, but also takes into account where each of those force sensors 52 are located relative to a reference point, such as, but not limited to, center point 90. Stated in another way, movement controller 50 is configured to take into account the amount of torque that is applied by the sum of the sensed forces about a generally vertical axis, such as one running through center point 90, or some other point, and control motors 54 and/or 56 in a manner based on this sensed torque.

Movement controller 50 takes into account the relative location of the applied forces by retrieving from a memory on board the patient support apparatus the location or locations of the one or more force sensors 52 that are currently detecting applied forces. These locations are defined in a coordinate frame of reference that has its origin located at reference point 90 so that no additional calculations of the sensor's location relative to reference point 90 need to be made.

While the embodiment of FIG. 15 shows force sensors 52 positioned at the junction of the side rails 44 and the frame 28, it will be understood that this location could be modified. For example, in one embodiment, force sensors 52 are mounted on the faces of any of the patient boundary structures (e.g. side rails 44, headboard 32, and/or footboard 34), rather than at the interface or junction of these structures and the frame 28. When so mounted, a caregiver could apply force directly to the force sensor 52, and forces applied to other locations of the patient boundary sensor would not be detected.

FIG. 16 shows a patient support apparatus 20k having a configuration of force sensors 52a that are different from the configuration of FIG. 15. In the configuration shown in FIG. 16, there are two force sensors 52, both of which are capable of detecting forces in both lateral direction 66 and longitudinal direction 88. Force sensors 52 of FIG. 15 are located at the junction of frame 28 and each of two height adjustment mechanisms 26. By positioning force sensors 52 in this location, any forces that are exerted in either lateral direction 66 or longitudinal direction 88 on frame 28 will be detected by one or both of sensors 52. In other words, when someone exerts a generally horizontal force on any portion of frame 28, including anything attached directly to frame 28 (such as the patient boundary structures), that force will be transmitted to one or both of elevation adjustment mechanisms 26, which support frame 28. However, because force sensors 52 are positioned at the junction of frame 28 and these adjustment mechanisms 26, the force sensors 52 will sense these forces.

The force sensor configuration of FIG. 16 has some advantages over the force sensor configuration of FIG. 15. First, there are fewer force sensors 52 required in the configuration of FIG. 16 than in the configuration of FIG. 15. The configuration of FIG. 15 may have up to twelve force sensors 52, while the configuration of FIG. 16 may have as few as two force sensors 52. Having fewer force sensors 52 generally reduces the cost of this configuration. Second, by placing force sensors 52 at the junction of the elevation adjustment mechanisms and the frame, a person can exert a force anywhere on frame 28, not just on the patient boundary structures that are coupled to frame 28 (such as in the configuration of FIG. 15). If a caregiver is standing between two side rails 44, for example, he or she can push or pull directly on frame 28 and have movement controller 50 respond in the corresponding manner.

As with the configuration of FIG. 15, movement controller 50 takes into account—in addition to the direction and magnitude of forces sensed by sensors 52—the location of the force sensors 52 relative to a reference point on patient support apparatus 20, such as, but not limited to, the center point 90. Thus, if the two force sensors 52 were asymmetrically positioned around center point 90, the detection of forces on both sensors 52 of equal magnitude and direction would result in a torque being applied with respect to center point 90. Movement controller 50 is programmed to take into account such torque when determining how to control steering motors 65 and/or driving motors 54. As was previously noted, center point 90 may be a geometrical center, or it may be a center of mass, or some other center.

FIG. 17 illustrates another embodiment of a patient support apparatus 20*l* having yet a different possible configuration of force sensors 52. In this embodiment, force sensors 52 are integrated into, or coupled to, wheels 24, or mounted between the wheels 24 and the wheel supports. As with the other force sensors 52, the force sensors 52 of FIG. 17 are configured to detect forces in both the lateral and longitudinal directions 66 and 88, respectively. These forces are forwarded to movement controller 50 which processes them in the same manners as have been previously described. As with the configurations of FIGS. 15 and 16, movement controller 50 for the support apparatus 20*l* of FIG. 17 takes into account the location of force sensors 52 relative to a reference point when controlling motors 54 and/or 56.

FIGS. 15-17 illustrate several patient support apparatus embodiments where there are several control locations available to one or more caregivers to control the powered movement of the support apparatus. These control locations include a head end control location 194, a foot end control location 196, a right side head location 198, a right side foot location 200, a left side head location 202, and a left side foot location 204 (FIGS. 18-21). A caregiver may stand in any of these various locations and exert a force on the frame and/or patient boundary structure. These exerted forces will then control, via movement controller 50, the movement of the patient support apparatus 20. By having multiple control locations, it is easier for a caregiver to effectuate powered movement of support apparatus 20 because he or she does not need to physically move to a single dedicated location for controlling such movement. This feature can be especially useful where an end or side (or both) of support apparatus 20 is positioned up against a wall, or other obstacle, and a caregiver cannot easily stand next to the portion of patient support apparatus adjacent the obstacle. By having multiple control locations, however, a caregiver is assured that control of powered movement can be carried out in any convenient location.

FIGS. 18-22 illustrate various different types of forces that may be applied at different positions to a patient support apparatus 20 and sensed by force sensors 52 (wherever located). The patient support apparatuses 20 depicted in these drawings do not specifically identify a type of wheel configuration because they may include any of the wheel configurations of FIGS. 3-13, or still other configurations. Similarly, the location of the force sensors 52 may be same as in any of FIGS. 15-17, or they may include still other force sensor locations and configurations.

FIG. 18 illustrates a situation in which a caregiver 94 located at the left side head control location 202 is applying a purely translational force 92 to one of the side rails 44 of a patient support apparatus 20*m*. In this example, the force sensors 52 (not shown) will detect this purely translational force and forward this detection to movement controller 50. Movement controller 50 will respond by controlling motors 54 and/or 56 such that patient support apparatus 20*m* will move with purely translational motion in the direction of force 92.

FIG. 19 illustrates a different situation in which a caregiver 94 is applying both a translational force 92 and a rotational force 96 to a patient support apparatus 20, which may be the same support apparatus 20*m* of FIG. 18, or it may be of a different configuration. More specifically, caregiver 94 is applying these forces to a side rail 44 of patient support apparatus. These translational and rotational forces are detected by force sensors 52, which are configured in any of the previously described configurations, or still other configurations. In response to these applied forces, movement controller 50 will move the patient support apparatus so that it both translates and rotates.

FIG. 20 illustrates another situation in which a pair of caregivers 94 is each applying a purely translational force 92, yet because the direction of each purely translational force 92 is not the same, the net result is to create a rotational force component in addition to a translational force component. The cumulative translational force 100 and cumulative rotational force 96 that result from the combination of the two translational forces 92 is shown in FIG. 20. This combination takes into account not only the direction and magnitude of the translational forces 92, but also their relative location to each other and to a reference point, such as, but not limited to, center point 90. Movement controller 50 will respond to the cumulative rotational force component 98 and cumulative translational force component 100 by controlling motors 54 and/or 56 so that the patient support apparatus 20 moves with a corresponding translational component and corresponding rotational component. The patient support apparatus 20 of FIG. is the same as the support apparatus 20*m* of FIG. 18, in one embodiment, although it will be understood that it may be different.

FIG. 21 shows yet another situation in which a caregiver is applying both a rotational force 96 and a translational force 92 to a foot end of a patient support apparatus 20*n*. In this embodiment of patient support apparatus 20*n*, the wheels 24 and movement controller 50 are configured to implement Ackermann steering. The two wheels 24 toward the foot end of patient support apparatus 20*n* therefore do not change direction, while the two wheels 24 toward the head end of patient support apparatus 20*n* are capable of changing direction. Based on the rotational and translational forces 96 and 92, respectively, applied by caregiver 94, movement controller 50 controls the steering of the two wheels 24 toward the head end of the support apparatus 20*n* so that they turn in a direction that corresponds to the rotational force 96. Movement controller 50 further drives any one or more of wheels 24 so that support apparatus 20*n* moves forward with a translational motion component corresponding to translational force 92.

Figure 22:
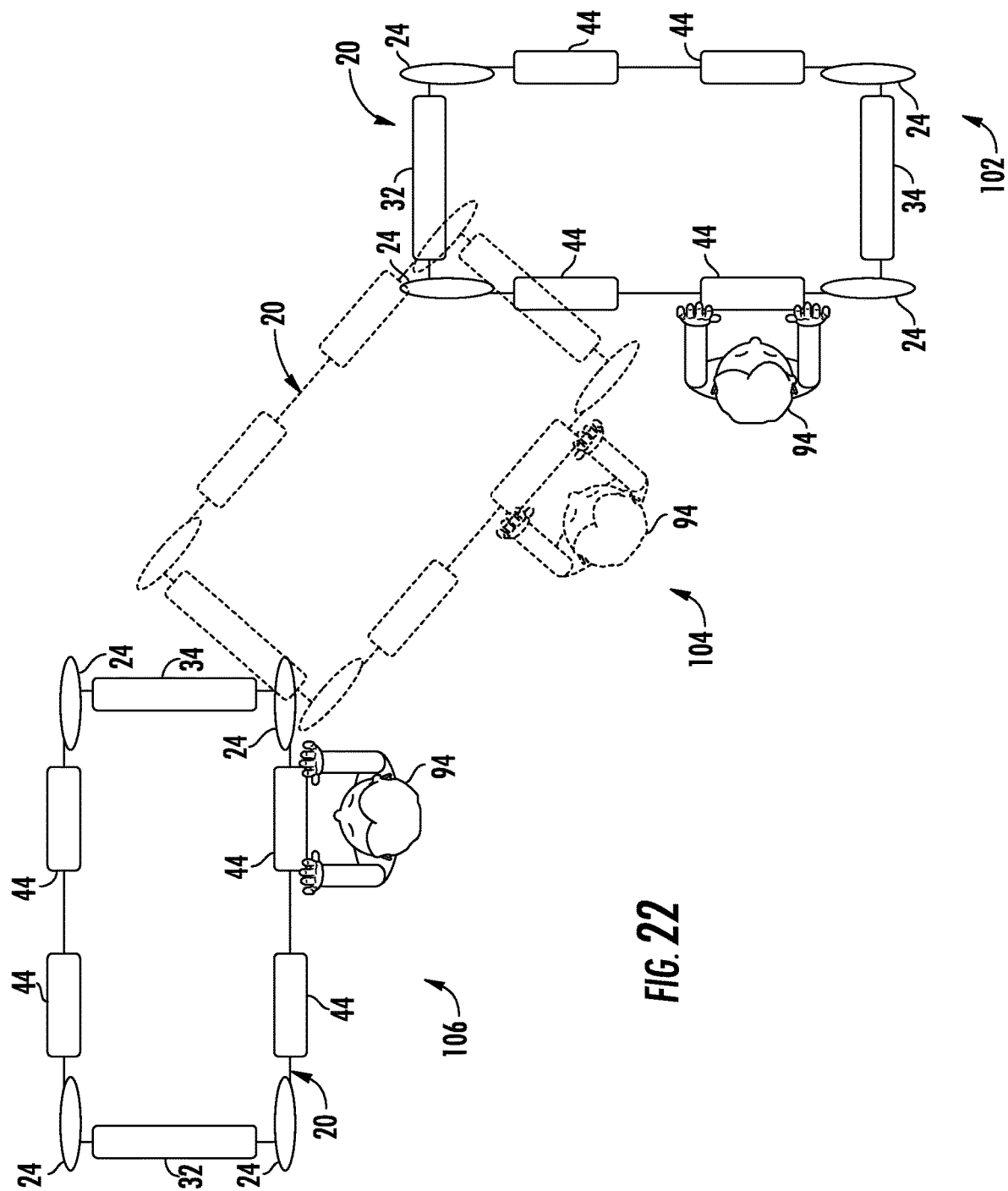
FIG. 22 is a plan view diagram of a caregiver controlling movement of a patient support apparatus embodiment via a side rail of the patient support apparatus.

FIG. 22 shows an example of the path that a patient support apparatus 20 might take under the control of movement controller 50 and the forces applied by a caregiver 94 to one of the side rails 44. Patient support apparatus 20 of FIG. 22 starts in an initial position 102 where a caregiver is positioned adjacent a foot end side rail 44. After the caregiver begins to exert forces on the side rail 44, which are sensed by appropriately positioned force sensors 52, patient support apparatus 20 begins to both rotate and translate. This rotation and translation will carry support apparatus 20 to an intermediate position 104, and eventually to a final position 106. In the final position 106, patient support apparatus 20 has rotated ninety degrees with respect to its initial position while the caregiver 94 did not need to reposition himself or herself with respect to support apparatus 20. The simple movement illustrated in FIG. 22 would not be possible with prior art powered patient support apparatuses, which likely would have required either multiple back and forth movements to move from initial position 102 to final position 106, repositioning of the caregiver 94 at different locations on support apparatus 20, and/or the use of a greater amount of space to make the transition from position 102 to position 106. Thus, patient support apparatus 20 allows more efficient movement with less space consumption. The patient support apparatus 20 of FIG. 22 may be any of the various embodiments depicted herein, such as, for example, any of patient support apparatuses 20a-20w, some of which have been described above and some of which will be described in more detail below.

FIGS. 23-26 illustrate several other patient support apparatus embodiments that include one or more additional assisted navigation features. Such assisted navigation features make it easier for a caregiver to control the movement of support apparatus 20. In the support apparatus embodiments of FIGS. 23-26, each patient support apparatus 20 includes at least one object sensor 108 attached thereto. Object sensors 108 are any sensors that are capable of detecting objects, obstacles, or other physical structures into which patient support apparatus 20 might collide with, bump into, or otherwise undesirably contact during movement. Object sensors 108 therefore include cameras, ultrasonic sensors, laser range finders, infrared projectors and sensors, and any other sensor capable of detecting the location of one or more objects relative to support apparatus 20.

Figure 23:
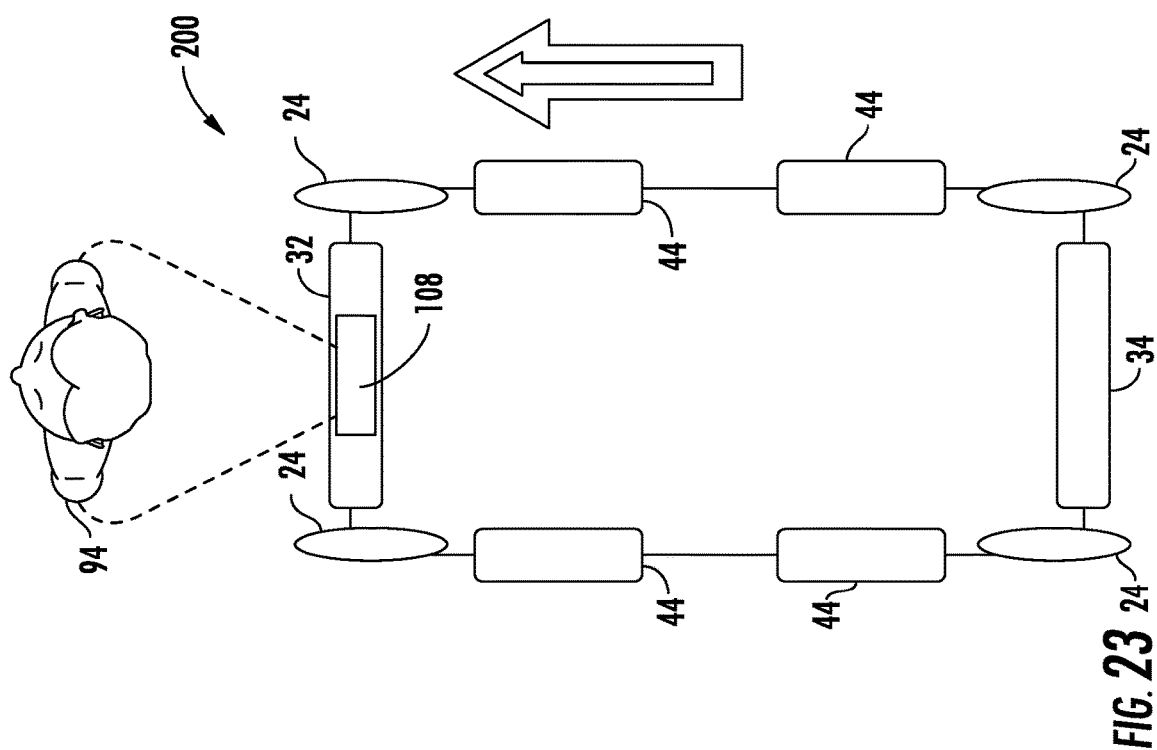
FIG. 23 is a plan view diagram of a patient support apparatus embodiment having one or more sensors allowing the patient support apparatus to automatically follow a walking caregiver positioned in front of the support apparatus.

The patient support apparatus 200 of FIG. 23 includes an object sensor 108 positioned at a head end of the support apparatus. Object sensor 108 is positioned on any of headboard 32, frame 28, elevation adjustment mechanism 26, or base 22, or integrated into any of these components. In other embodiments, object sensor 108 includes multiple components, and these components are dispersed amongst any of headboard 32, frame 28, elevation adjustment mechanism 26, and/or base 22. In the embodiment of FIG. 23, the control system of patient support apparatus 20o—which is control system 48 (FIG. 2), or control system 110 (FIG. 35), or any other suitable control system—is modified to include a "follow me" mode. The "follow me" mode allows the patient support apparatus 20o to automatically move and steer itself so as to follow behind an authorized individual, such as caregiver 94, as he or she walks. This is accomplished by object sensor 108 detecting the location of the caregiver 94 in front of support apparatus 20o and movement controller 50 issuing appropriate steering and driving commands to motors 56 and 54 so as to cause support apparatus 20o to follow behind the caregiver. Movement controller 50 controls the steering and driving of patient support apparatus 20o in a closed loop manner that seeks to maintain a specific distance, or range of distances, between support apparatus 20o and caregiver 94. Object sensor 108 also detects the relative lateral position of caregiver 94 with respect to the foot end of support apparatus 20o and movement controller 50 uses that information in steering support apparatus 20o.

The "follow me" mode of patient support apparatus 20o in FIG. 23 is turned on and off in any desirable manner. In some instances, there is a switch, button, or other control positioned on one or more control panels of the patient support apparatus. In other instances, the activation and deactivation of the "follow me" mode takes into account the presence or absence of an RF ID tag worn by caregiver 94. For example, in some instances, support apparatus 20o is designed so that the "follow me" mode can only be used to follow individuals who are wearing RF ID tags, badges, or other authorized devices that can be detected by one or more other sensors positioned on patient support apparatus 200. This is accomplished by including one or more RF ID detectors on the patient support apparatus 20o that are able to detect when an RF ID tag is within the vicinity of patient support apparatus 20o—particularly in the front area of the patient support apparatus 20o where the tag-wearer will be positioned during the "follow me" mode—and having the internal circuitry on patient support apparatus 20o automatically switch on the "follow me" mode; or, alternatively, having the internal circuitry on patient support apparatus 20o automatically provide the option of turning on the "follow me" mode via one or more of the normal user interfaces included on the patient support apparatus 20o. In some embodiments, the detection of the RF ID tag is accomplished through any of the near field detection techniques and systems disclosed in commonly assigned U.S. patent application Ser. No. 61/701,943 filed Sep. 17, 2012 by applicants Mike Hayes et al. and entitled COMMUNICATION SYSTEMS FOR PATIENT SUPPORT APPARATUSES, the complete disclosure of which is hereby incorporated herein by reference. In other embodiments, other techniques and/or systems are used.

Figure 24:
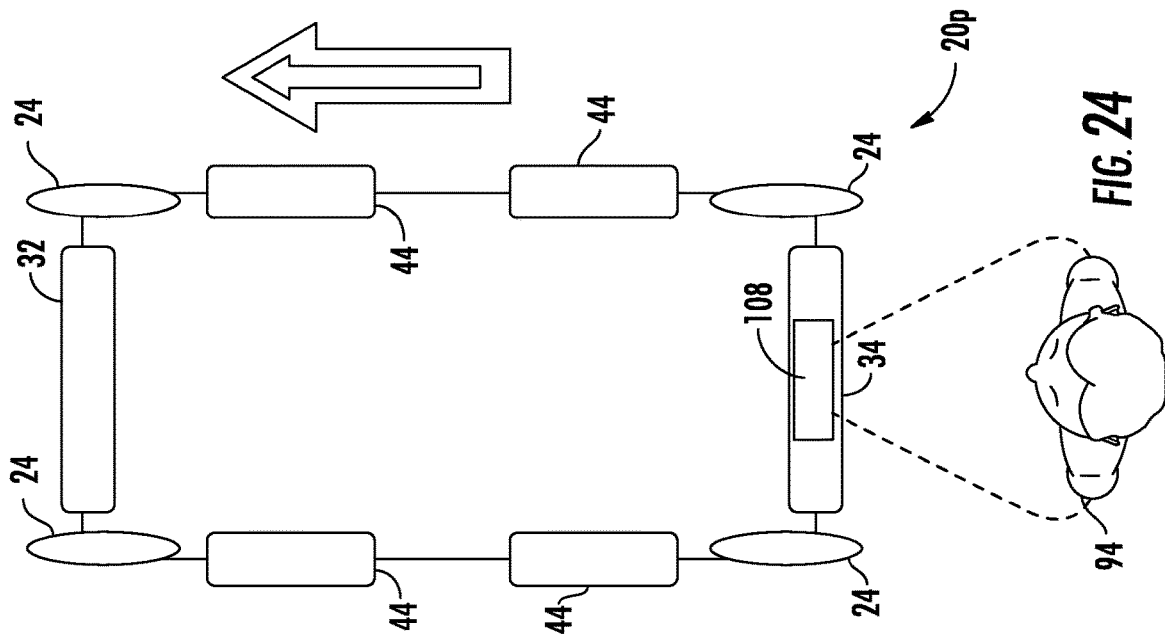
FIG. 24 is a plan view diagram of a patient support apparatus embodiment having one or more sensors allowing the patient support apparatus to automatically stay in front of a walking caregiver.

FIG. 24 illustrates another embodiment of a patient support apparatus 20p that includes a control system that is adapted to allow a user to select a "hands free push" mode. The "hands free push" mode can be incorporated into a patient support apparatus 20p that also has the capability of the "follow me" mode (e.g. apparatus 20o of FIG. 23), or it can be incorporated into a patient support apparatus by itself. The "hands free push" mode is like the "follow me" mode, but reversed. That is, in the "hands free push" mode, movement controller 50 controls motors 54 and 56 so as to move support apparatus 20p in a way that stays ahead of caregiver 94, who is positioned behind support apparatus 20p. In carrying out this movement, movement controller 50 relies on signals coming from an object sensor 108 positioned at the foot end of support apparatus 20p. This object sensor is positioned on footboard 34, frame 28, elevation adjustment mechanism 26, or base 22, or integrated into any of these components. In other embodiments, object sensor 108 includes multiple components, and these components may be dispersed amongst any of footboard 34, frame 28, elevation adjustment mechanism 26, and/or base 22. Based on the output of the object sensor 108, movement controller 50 steers and drives patient support apparatus 20p in a manner that seeks to maintain a specific distance, or range of distances, between support apparatus 20p and caregiver 94. In one embodiment, object sensor 108 detects the relative lateral position of caregiver 94 with respect to the foot end of support apparatus 20p and movement controller 50 uses that information in steering support apparatus 20p.

The "hands free push" mode is turned on and off in any of the same manners discussed above with respect to the "follow me mode," or in still different manners. That is, there may be a switch, button, or other control positioned on one or more control panels of the patient support apparatus. The activation and deactivation of this mode may also, or alternatively, take into account the presence or absence of an RF ID tag worn by caregiver 94. For example, in some instances, support apparatus 20p is designed so that the "hands free push" mode is only accessible to individuals who are wearing RF ID tags, badges, or other authorized devices that can be detected by one or more other sensors positioned on patient support apparatus 20p. As noted above, such sensors are, in some embodiments, the same or similar to those disclosed in the commonly assigned U.S. application Ser. No. 61/701,943, which has been incorporated herein by reference.

It will be understood by those skilled in the art that either or both of the "follow me" and "hands free push" modes illustrated in FIGS. 23 and 24 can be incorporated, either individually, or in combination, into any of the patient support apparatuses described herein, and that these modes are able to be implemented using any of the wheel configurations and any of the force sensor configurations that are described herein.

FIG. 25 illustrates another embodiment of a patient support apparatus 20q that includes one or more object sensors 108 that are used to assist in the steering of support apparatus 20q as it moves. Unlike the embodiments of FIGS. 23 and 24, the embodiment shown in FIG. 25 relies upon forces exerted by a user (and detected by force sensors 52) to initiate and provide most of the control for the movement of support apparatus 20q. However, unlike most of the previous support apparatus embodiments described above, the apparatus 20q of FIG. 25 is configured to allow signals from object sensor 108 to override, either partially or wholly, steering commands detected via force sensors 52. That is, the control system of the support apparatus of FIG. 25 is configured to follow and implement the steering and motion commands of a caregiver only to the extent they do not cause, or likely lead to, a collision with any objects that are detectable by object sensor 108. If movement controller 50 determines that the user inputs are likely to lead to a collision—based on the outputs from object sensor 108—it automatically takes corrective measures. Such corrective measures include steering the support apparatus 20q away from the detected object, slowing the speed of support apparatus 20q, or a combination of the two.

In the example illustrated in FIG. 25, a caregiver 94 is shown exerting a forward translational force 92 on support apparatus 20q. Movement controller 50 converts this forward translational force into speed and steering commands that cause support apparatus 20q to move forward in the same direction as force 92. However, upon nearing walls 112, object sensor 108 will detect the presence of walls 112, as well as the absence of these walls in a doorway 114 defined between walls 112. Movement controller 50 will therefore steer patient support apparatus 20q toward doorway 114 despite the fact that caregiver 94 might continue to exert a purely translational force 92 that would otherwise direct support apparatus 20q into wall 112. In addition to steering support apparatus 20q toward doorway 114, controller 50 also decreases the speed of support apparatus 20q, as appropriate. Indeed, if movement controller 50 determines from object sensor 108's readings that doorway 114 is too narrow to fit through, controller 50 brings patient support apparatus 20q to a complete stop.

In an alternative embodiment, instead of changing the steering and/or driving of one or more wheels 24, patient support apparatus 20q of FIG. 25 could be configured to merely issue an alert or other warning signal if object sensor 108 detects an object. Such an alert could be visual, aural, tactile, or any combination of these. By only providing such an alert, the caregiver 94 would be made aware of the potential collision, but controller 50 would leave it up to the caregiver 94 to take the appropriate corrections to the speed and course of support apparatus 20q so as to avoid a collision. In addition to the alerts, support apparatus 20q could be configured to include a display that provided an indication where on patient support apparatus 20q the likely collision is going to occur, which is especially helpful when support apparatus 20q is bulky and/or otherwise obstructs the view of a caregiver positioned behind it.

The steering assist feature illustrated in FIG. 25 can be implemented in any of the patient support apparatuses described herein. That is, it is usable with any of the wheel configurations described herein, and/or with any of the force sensor configurations described herein. Further, it may also be incorporated into, if desired, a patient support apparatus 20 that also includes one or both (or neither) of the "follow me" and "hands free push" modes of FIGS. 23 and 24, respectively.

Figure 26:
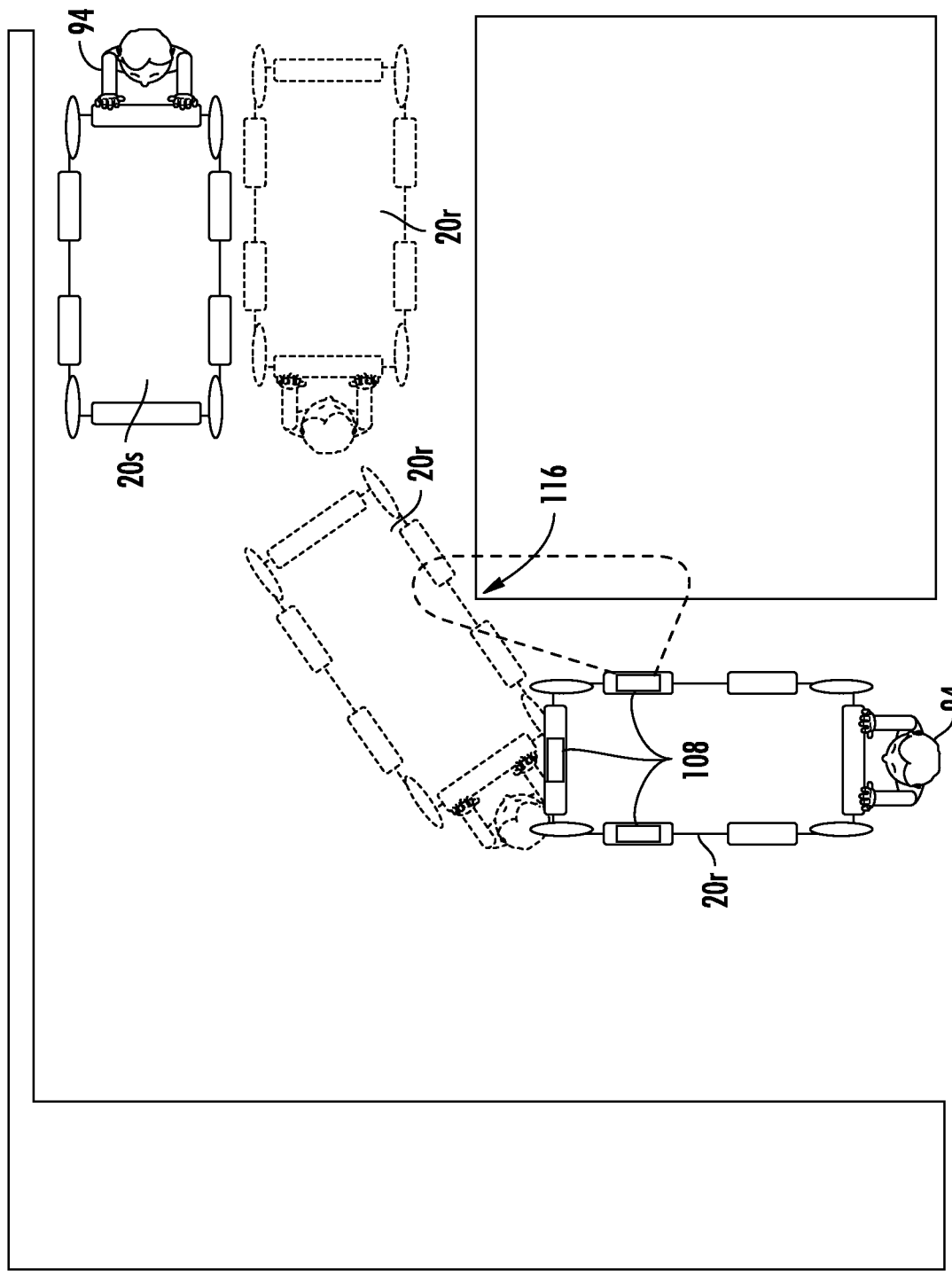
FIG. 26 is a plan view diagram of a patient support apparatus embodiments having one or more sensors allowing the patient support apparatus to automatically steer tightly around corners so as to minimize the space occupied by the support apparatus during corner turns.

FIG. 26 illustrates another control algorithm or feature that may be incorporated into any of the patient support apparatuses 20 having one or more object sensors 108. More specifically, FIG. 26 illustrates a turning feature that enables a caregiver 94 to tightly turn a first patient support apparatus 20r about a corner. This is especially helpful in situations where other obstacles are present, or in other tight spaces. For example, in the situation of FIG. 26, a second patient support apparatus 20s is shown that would be an obstacle for turning support apparatus 20r were it not able to tightly turn around corner 116. In other words, to avoid a collision in the situation where support apparatus 20r was not equipped with a corner turning feature, either the caregiver controlling support apparatus 20k would have to wait until support apparatus 20s moved out of the way, or the caregiver controlling support apparatus 20k would have to wait until the caregiver controlling support apparatus manipulated a wide corner turn that would likely involve back and forth motion.

The corner turning feature of FIG. 26 includes not only sensing the location of a corner via object sensor 108, but also controlling the steering of one or more wheels 24 so as to stay within a close distance to corner 116 as support apparatus 20r is moved. If patient support apparatus 20 is equipped with a wheel configuration that allows one or more forwardly positioned wheels 24 and one or more rearwardly positioned wheels 24 to be steered independently of each other, then movement controller 50 will also utilize this steering capability to more automatically effectuate a tighter turn than would otherwise be possible without this capability.

Figure 27:
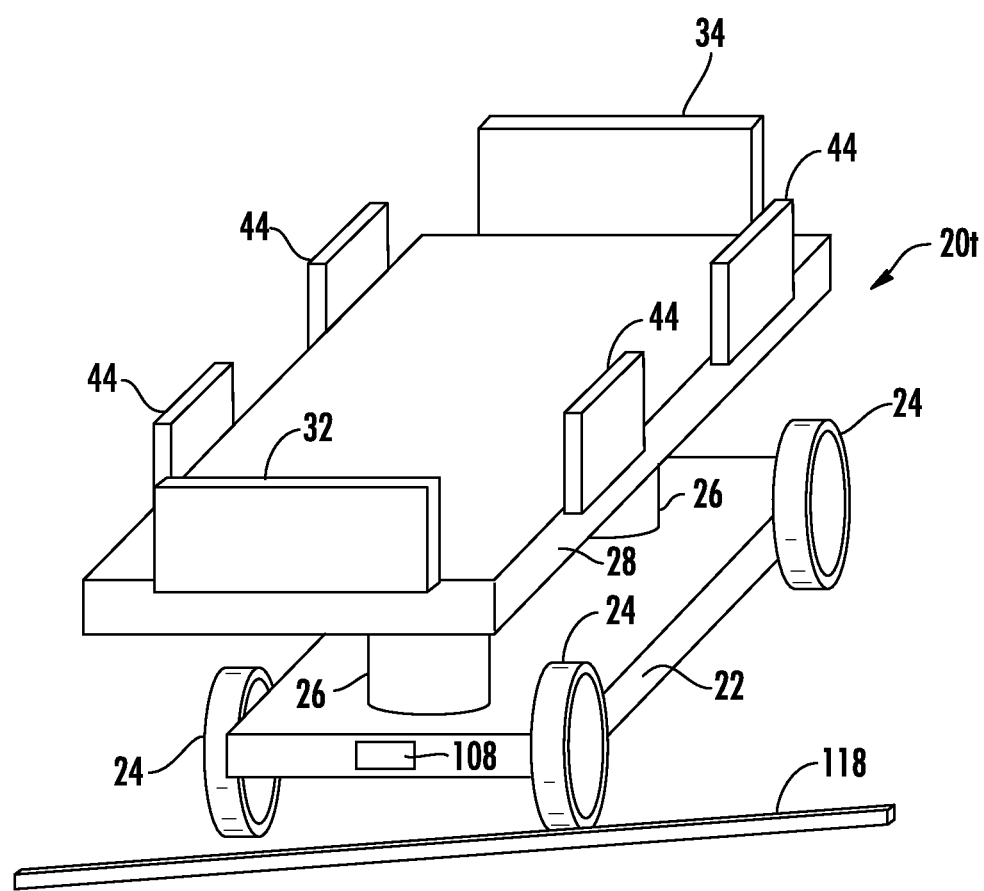
FIG. 27 is a perspective view diagram of a patient support apparatus embodiment having one or more sensors allowing the patient support apparatus to raise one or more wheels when traveling over a cord, threshold, or other discontinuity in the floor.

FIG. 27 illustrates another embodiment of a patient support apparatus 20t that includes a wheel-raising feature adapted to mitigate jostling of support apparatus 20t, as well as the patient support thereon, when traversing discontinuities in floor height, whether due to obstacles, such as a cord 118, or to other things. Support apparatus 20t of FIG. 27 includes an object sensor 108 that is positioned at an end of support apparatus 20t, and which is coupled to base 22 thereof (although its location can be varied). Regardless of the physical position of sensor 108, it is adapted to detect objects and/or surface discontinuities that patient support apparatus 20t might encounter as it moves. Object sensor 108 is further adapted to be able to detect the size of the object or floor discontinuity and communicate a signal with the size information to a wheel controller (not shown) that is able to lift one or more wheels 24 as the support apparatus 20t travels over the obstacle. Object sensor 108 is further adapted to detect the distance to the object as support apparatus 20t moves and to provide updates of this distance measurement to the wheel controller so that wheel controller can time the lifting of the one or more wheels 24 to coincide with the actual passage over the object or discontinuity. By lifting the wheel, the jostling impact that might otherwise have occurred without the wheel lifting is reduced or eliminated, thereby increase the comfort of the patient riding on patient support apparatus 20*t*. The wheel lifting feature of FIG. 27 may be incorporated into any of the patient support apparatuses 20 discussed herein, either alone or in any combination with the other control features discussed herein.

Figure 28:
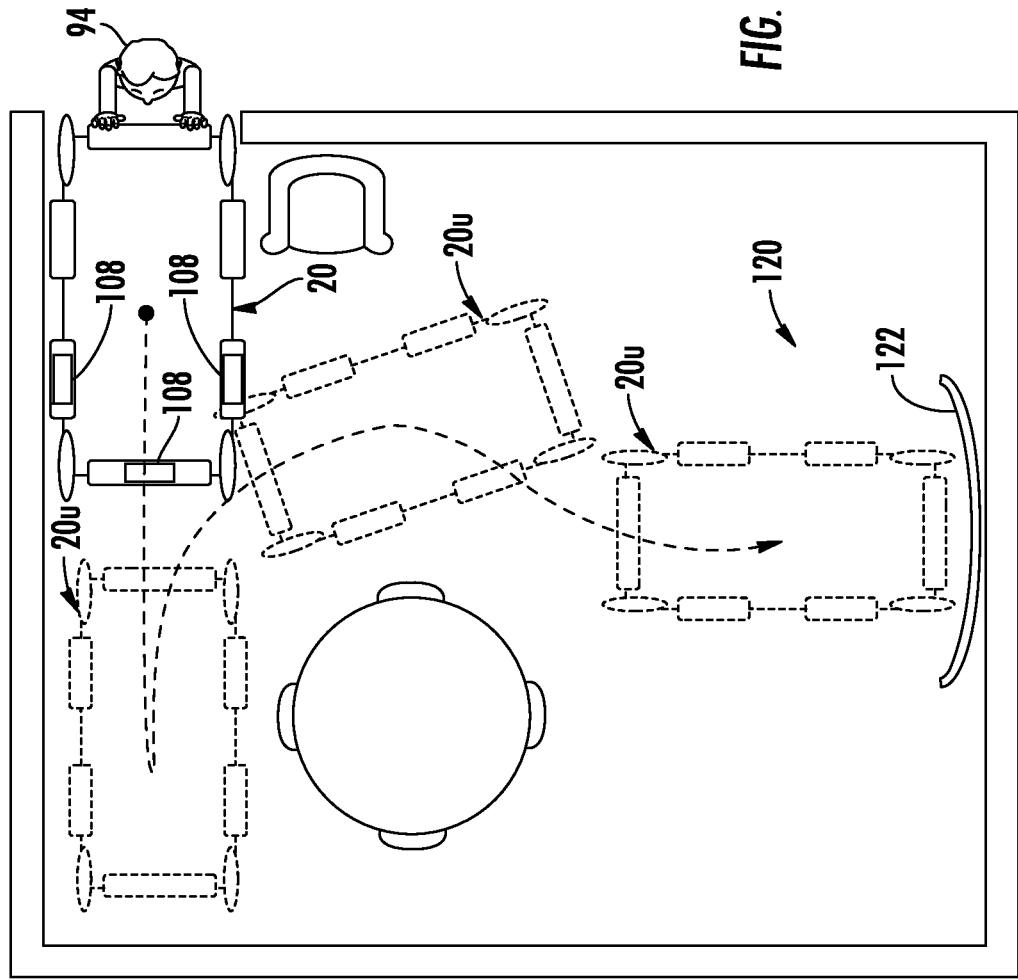
FIG. 28 is a plan view diagram of a patient support apparatus illustrating an auto-docking feature that may be incorporated into any of the patient support apparatus embodiments discussed herein.

FIG. 28 illustrates another patient support apparatus 20*u* which includes a control system adapted to provide an auto-docking feature. The auto-docking feature automatically steers and moves patient support apparatus 20*u* into a preferred location, with a preferred orientation, within a given room. As shown in FIG. 28, a docked position 120 is defined adjacent to a wall having a sensor or locating unit 122 mounted thereto. Support apparatus 20*u*, in addition to one or more object sensors 108, includes a sensor that is able to communicate with locating unit 122 in a manner that allows support apparatus 20*u* to determine its relative position within the room.

In some embodiments, support apparatus 20*u* has all of the floor plans, or room plans, within a given facility stored within its memory and locating unit 122 simply provides an indication of which room support apparatus 20*u* is currently located in. Once support apparatus 20*u* knows which room it is positioned it, it retrieves from its memory the preferred docking location 120 corresponding to that room. Upon activation of the auto-docking feature by a caregiver, support apparatus 20*u* will maneuver itself into the docked position 120. This maneuvering may require steering itself around other objects that are in the room. In order to accomplish this, one or more object sensors 108 are incorporated into support apparatus 20*u* such that it can steer itself to avoid the detected objects.

In other embodiments, support apparatus 20*u* of FIG. 28 does not include room layouts stored in memory, but instead automatically guides itself to the docked position 120 by appropriate communications with locating unit 122. Such communications include any form of information sharing that helps guide patient support apparatus 20*u* to docking location 120. The commencement of the auto-docking operation is initiated by the manipulation of any suitable user control. As with the other control features disclosed herein, this auto-docking feature is able to be incorporated into any of the patient support apparatuses 20 discussed herein, either alone or in any combination with the other control features discussed herein.

Figure 29:
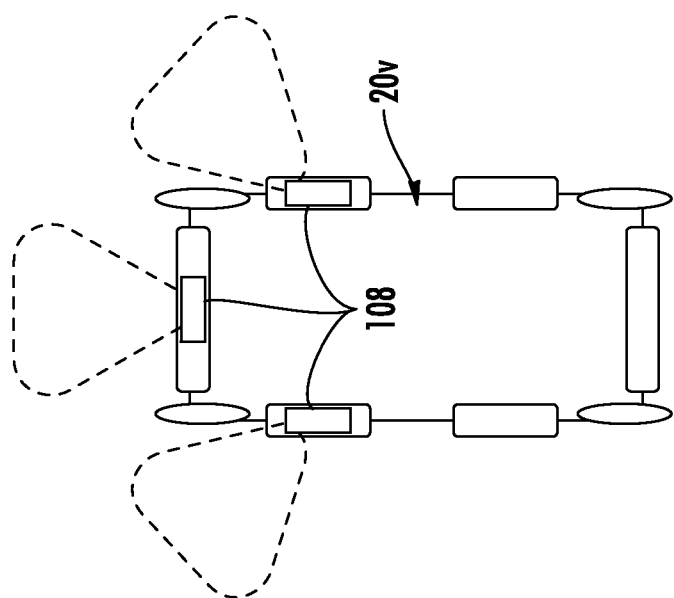
FIG. 29 is a plan view diagram of a patient support apparatus embodiment incorporating a plurality of sensors that enable the patient support apparatus to automatically navigate without the need for human steering.
Figure 30:
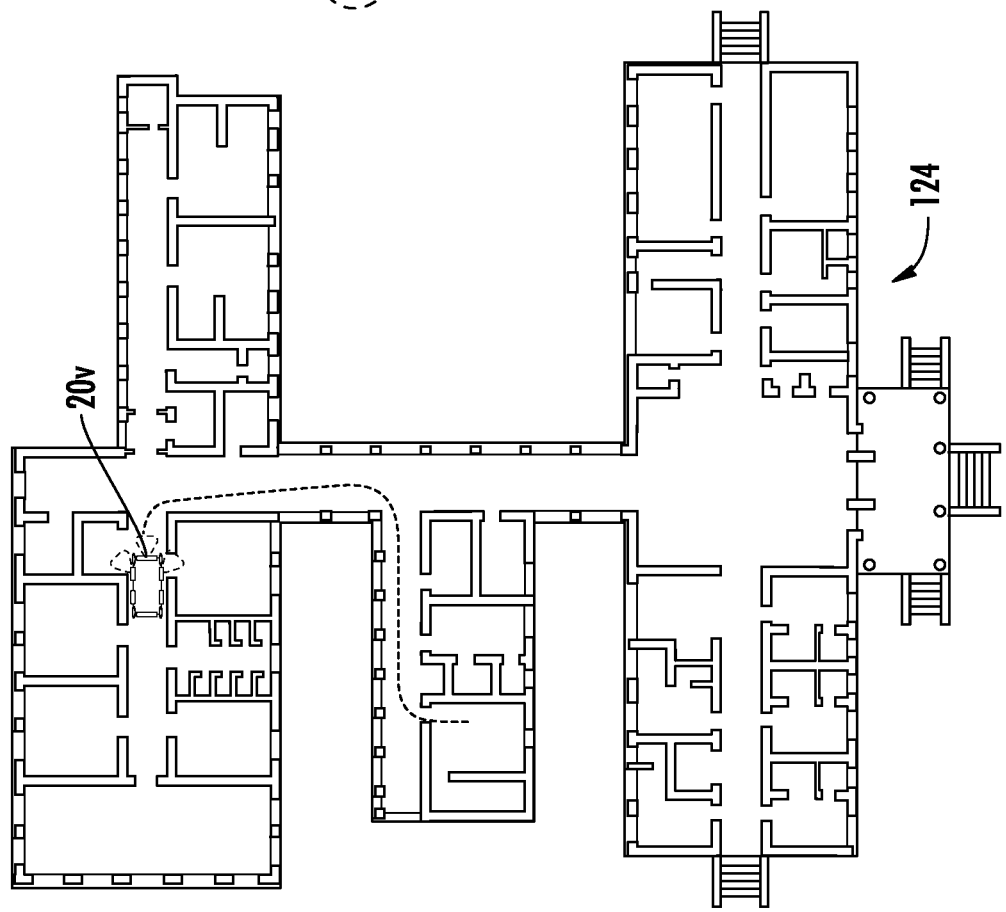
FIG. 30 is a plan view diagram of an arbitrary healthcare facility floor plan illustrating an example of automatic movement of the patient support apparatus of FIG. 29.

FIGS. 29 and 30 illustrate another embodiment of a patient support apparatus 20*v* that includes an automated navigation feature. In this embodiment, patient support apparatus 20*v* is configured such that it is able to automatically navigate from a first location within a healthcare facility to a second location within the healthcare facility, without the need for a caregiver to steer or otherwise manipulate the support apparatus 20*v*. This feature enables the patient support apparatus 20*v* to function, in some embodiments, with various features and capabilities that are similar to conventional automatic guided vehicles used in the material handling industry. This feature further allows a caregiver to input a destination into support apparatus 20*v* and have the patient transport thereto automatically without requiring a staff member to accompany the patient during this transport. Alternatively, the caregiver can accompany the patient during transport, but the caregiver will be free from having to steer and push the support apparatus 20*v*, and therefore can focus on other activities.

The automatic navigation of support apparatus 20*v* of FIGS. 29 and 30 may be accomplished in a variety of different manners. In one embodiment, object sensors 108 are sufficient by themselves to enable support apparatus 20*v* to steer itself down hallways and corridors without collision to thereby move support apparatus 20*v* to the intended destination. In other embodiments, additional sensors are included on support apparatus 20*v* that enable it to automatically navigate. Such sensors include wheel encoders that monitor the number of rotations of one or more wheels 24. This enables support apparatus 20*v* to determine the distance it has traveled. Further, by monitoring the difference in rotation counts between two encoders coupled to wheels 24 positioned on opposite sides of support apparatus 20*v*, the turns of support apparatus are detected. Still further, encoders coupled to any one or more of motors 54 and 56 monitor the distance traveled and the direction of that travel. Other sensors, such as gyroscopes, inertial reference units, accelerometers, and/or still other sensors can also be included to provide additional navigational information.

In one embodiment, support apparatus 20*v* includes a floor plan or map 124 stored in its memory that identifies the layout of a floor or section of a healthcare facility, including the location of the rooms within that facility. In some embodiments, one or more landmarks are positioned throughout the healthcare facility at fixed locations that are detectable by support apparatus 20*v*. The locations of these landmarks are included in map 124 stored in the memory of support apparatus 20*v*. When support apparatus 20*v* detects one or more of these landmarks, it uses the detection of that one or more landmarks to update its position by consulting the stored map, which indicates the location of those landmarks within the healthcare facility.

Figure 31:
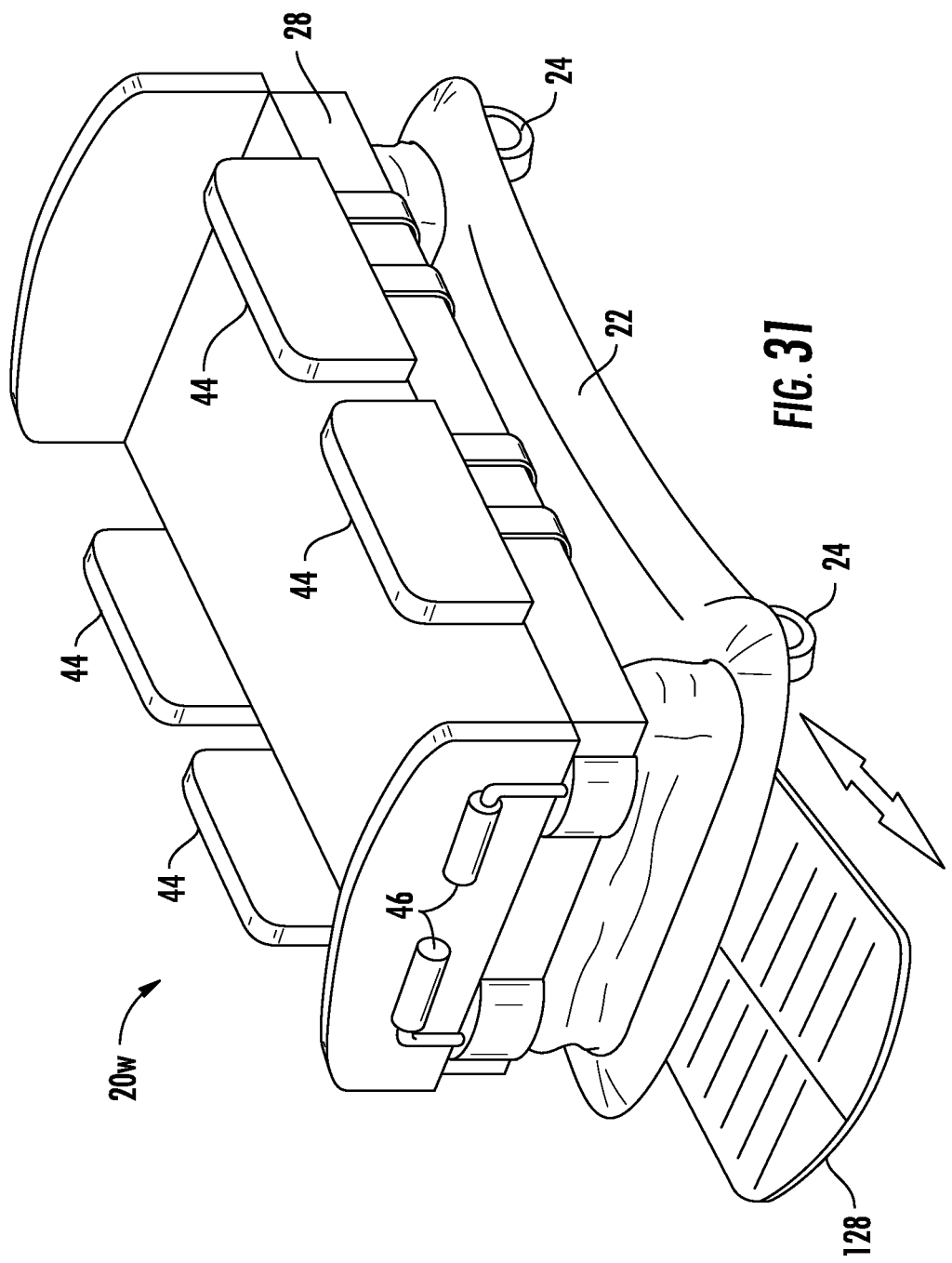

FIG. 31 illustrates yet another embodiment of a patient support apparatus 20*w*. In the embodiment of FIG. 31, support apparatus 20*w* includes an extendable and retractable riding platform 128 that is positioned at an end of support apparatus 20*w*. Riding platform 128 provides a platform on which a caregiver is able to stand while manipulating the movement of support apparatus. In the embodiment of FIG. 31, support apparatus 20*w* includes a pair of handles 46 that are used by a caregiver to control the movement of support apparatus 20*w*. Handles 46 include one or more force sensors 52 positioned thereon, or they make pivoting contact with one or more force sensors 52 as a user manipulates them, or they use other devices for detecting the movements desired by a caregiver. One such other device includes potentiometers that measure the amount of pivoting of handles 46 as a caregiver pushes or pulls back on them. The amount of this pivoting is forwarded to movement controller 50, which implements the corresponding movement commands to one or more motors 54/56.

A separate force sensor 52, or other type of sensor, is included in each handle 46 so that the amount of force applied, or pivoting implemented, by a user to each handle 46 is separately determined. By making separate readings for each handle 46, movement controller 50 is able to determine in which manner, if any, the caregiver wishes to turn support apparatus 20*w*, and thereafter implement the appropriate commands to motors 54 and/or 56.

Riding platform 128 is both extendable out of, and retractable into, a portion of base 22, or it is positioned within either a space defined between the top of base 22 and the bottom of frame 28, or a space defined between the bottom of base 22 and the floor on which support apparatus 20*w* is positioned. Riding platform 128 is either supported in a cantilevered fashion from underneath support apparatus 20w, or it includes one or more wheels positioned underneath it that ride on the floor and help support the platform 128 when it is in the extended position. Riding platform 128 is able to be incorporated into any of the patient support apparatus embodiments discussed herein.

Figure 32:
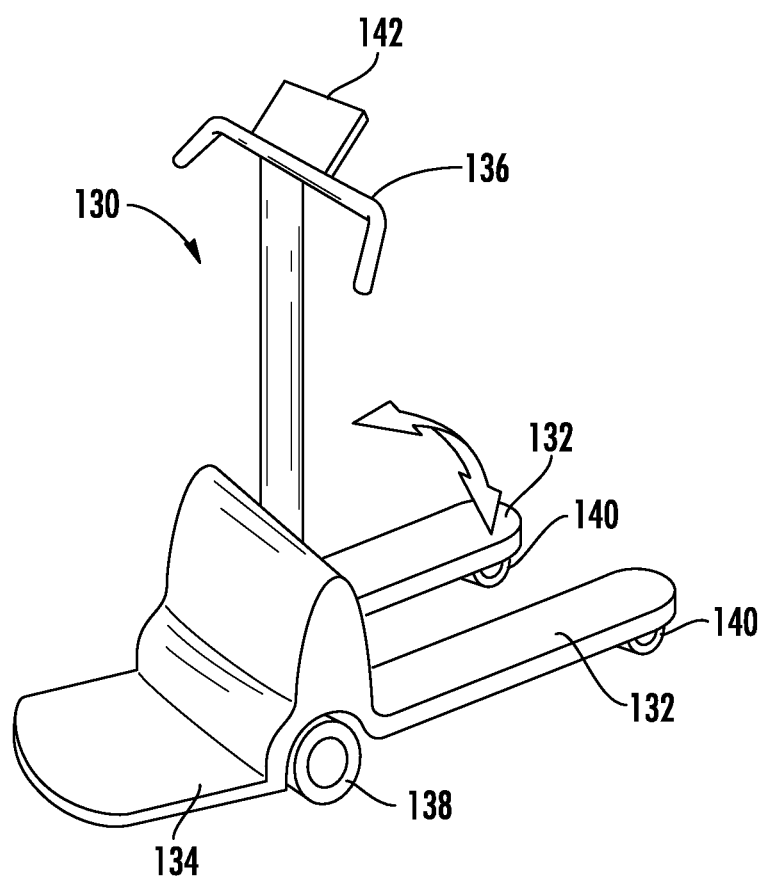
FIG. 32 is a perspective view of a patient support apparatus mover that may be coupled and uncoupled to a patient support apparatus for moving the support apparatus.

FIG. 32 illustrates a rideable bed mover 130 that includes a pair of retractable legs 132 that are retractable from a generally flat and extended position (shown in FIG. 32) to a generally upright and vertical position. In the position shown in FIG. 32, legs 132 are inserted under a conventional patient support apparatus 20 that does not have powered movement capabilities and moved, by way of mover 130, from one location to another. Bed mover 130 includes a platform 134 on which a caregiver is able to stand and ride during movement of bed mover 130. Platform 134 may either be fixed, or it may be movable between an extended use position (shown in FIG. 32), and a more compact non-use position. After legs 132 of bed mover 130 are inserted underneath a patient support apparatus 20, they are partially lifted upward so as to raise or tip a portion of the patient support apparatus 20, or they are otherwise positioned so as to securely engage the patient support apparatus 20. The partial lifting or tipping is accomplished in any suitable manner. One or more structures may also be included on either of legs 132 for releasably securing mover 130 to the patient support apparatus 20.

In some embodiments, the control of bed mover 130 is carried out in the same manner as the control of any of the patient support apparatuses described herein. That is, in some embodiments, bed mover 130 includes one or more force sensors 52, which are positioned at suitable location(s) thereon, such as, but not limited to, a handle 136 of mover 130, or elsewhere. Such force sensors 52 are configured to detect both a magnitude and direction of one or more forces applied by a user and forward that information to a controller, such as movement controller 50, or another controller. Based on that information, mover 130 provides automatic driving and/or steering of its wheels 138 in order to guide it, and an associated patient support apparatus 20, to a new location. In some embodiments, mover 130 includes a plurality of wheels 138 that are each independently steerable and drivable. In other embodiments, only a subset of the wheels 138 is drivable and/or steerable. Further, in some embodiments, the drivable and steerable wheels 138 are the same, while in others they are different.

In the embodiment shown in FIG. 32, mover 130 includes four wheels, a pair of large wheels 138 and a pair of small wheel 140 that are positioned underneath legs 132. In this embodiment, small wheels 140 are neither drivable nor steerable. Instead, the driving and steering is accomplished through the control of large wheels 138. The steering of large wheels 138 is carried out by rotating each of the two large wheels 138 at different speeds, or it is carried out by rotating the axis of rotation of each wheel about a generally vertical axis.

In some embodiments, mover 130 includes a removable touch controller 142, such as, but not limited to, a touch screen controller. Touch screen controller 142 is, in one embodiment, a removable computer that is able to be coupled to a patient support apparatus 20, such as is described in greater detail in commonly assigned, copending U.S. provisional patent application Ser. No. 61/606,147 filed Mar. 2, 2012 by applicants Cory Herbst and entitled PATIENT SUPPORT, the complete disclosure of which is hereby incorporated herein by reference. Controller 142 provides a user interface adapted to allow a user to control one or more functions of patient support apparatus 20. In order to accomplish this control, mover 130 includes an electrical connector (not shown) that plugs into a corresponding connector on support apparatus 20 and allows commands and/or other electronic information to be passed between mover 130 and patient support apparatus 20. In some embodiments, this connection is a wire or cable, while in other embodiments, it is wireless. In still other embodiments, the communication connection is carried out by inductive coupling. Examples of suitable inductive coupling structures and methods that can be used with mover 130 are disclosed in commonly assigned, copending U.S. patent application Ser. No. 13/296,656 filed Nov. 15, 2011 by applicants Guy Lemire et al. and entitled Patient Support with Wireless Data and/or Energy Transfer, the complete disclosure of which is hereby incorporated herein by reference. Other types of inductive coupling may alternatively be used.

Figure 33:
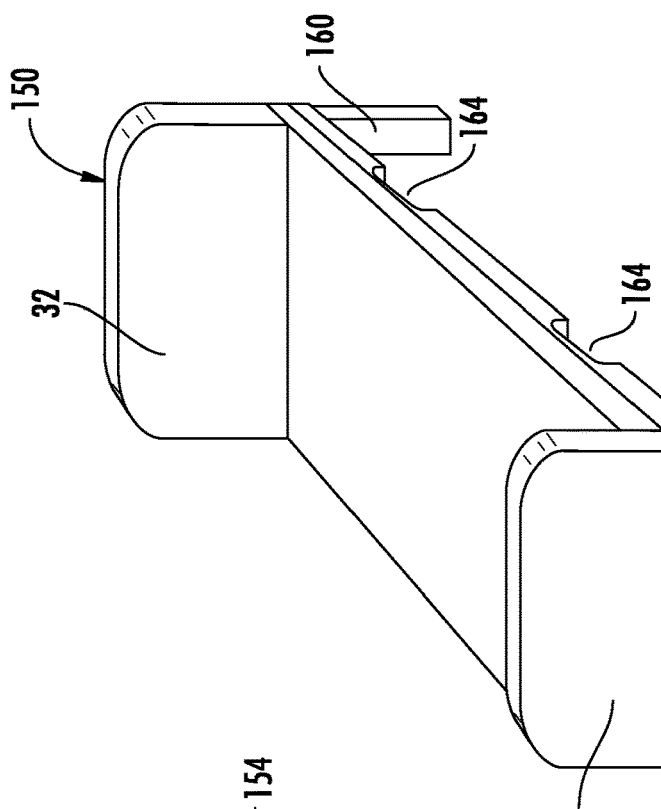
FIG. 33 is a perspective view of a patient support apparatus having no built-in movement-across-the-floor capabilities.
Figure 34:
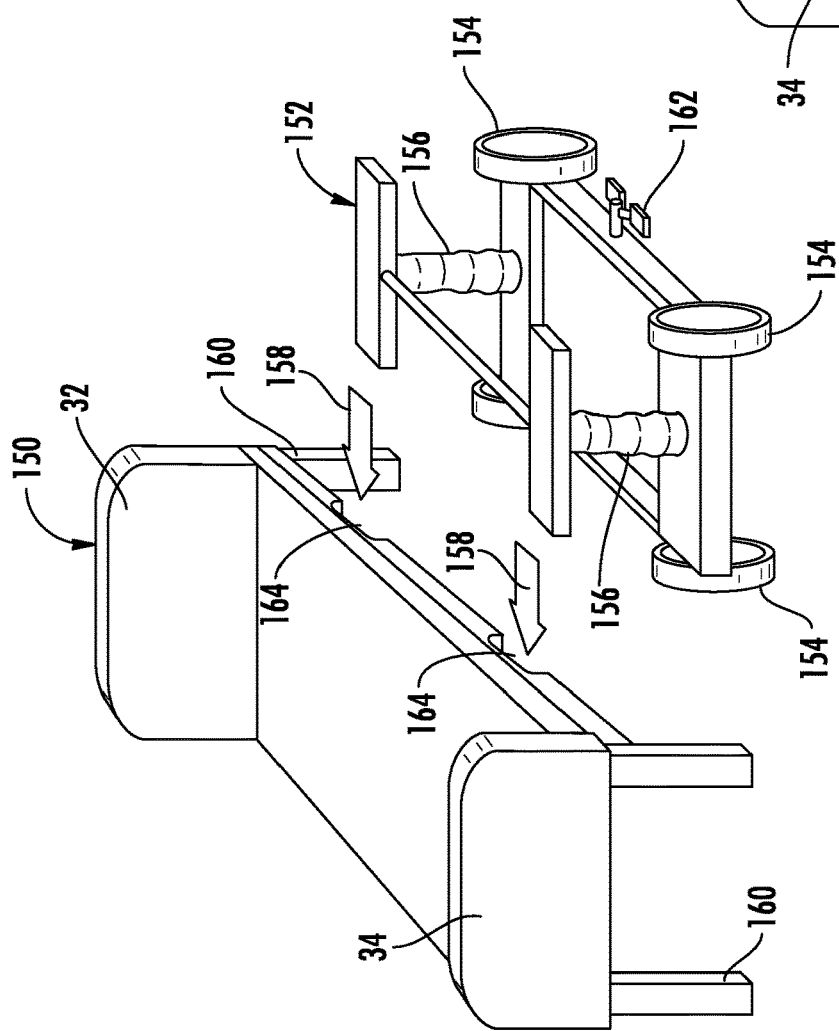
FIG. 34 is a perspective view of the patient support apparatus of FIG. 33 showing a mobile base that may be coupled to the support apparatus to allow the support apparatus to be moved and steered in a powered manner over the floor.

FIGS. 33 and 34 illustrate another system and method for transporting patient support apparatuses from one location to another. As shown in these figures, a non-mobile patient support apparatus 150 is effectively made mobile by the temporary addition of a mobility base 152. The mobility base 152 includes a plurality of wheels 154, at least some of which are powered and at least some of which are steered. One or more steering motors 56 and/or driving motors 54 are included within base 152 for steering and driving the wheels 154 of mobility base 152. Mobility base 152 includes a pair of elevation adjustment mechanisms or lifts 156 that can be raised and lowered. In order to move a non-mobile support apparatus 150, mobility base 152 is moved underneath the support apparatus 150 in a lateral direction 158 (FIG. 34). The movement of base 152 in this lateral direction 158 may be facilitated by having all four wheels 154 steerable or freely rotatable so that base 152 can translate in a direction parallel to lateral direction 158, thereby allowing base 152 to be rolled underneath support apparatus 150 from one of its sides.

Once positioned underneath support apparatus 150, the height of lifts 156 is adjusted so that support apparatus 150 is lifted. Such lifting causes a plurality of legs 160 of support apparatus 150 to disconnect with the ground, which would otherwise prevent rolling movement of the combined support apparatus 150 and base 152. The lifting and lowering of lifts 156 (and support apparatus 150 when positioned over base 152) is accomplished via one or more pedals 162 positioned on base 152. Such pedals are coupled to an electric motor, a hydraulic pump, or any other suitable structures for raising and lowering lifts 156. Support apparatus 150 may include a plurality of slots 164, or other structures, defined on its underside that releasably receive the upper section of lifts 156 so as to releasably secure support apparatus 150 to base 152. Such temporary securement should be sufficient to prevent support apparatus 150 from tipping during movement of base 152.

The control of the movement of base 152 is carried out in any of a variety of different manners. In one embodiment, a separate control unit, such as a touch screen controller 142, is provided that communicates with base 152. The touch screen controller 142 is releasably positionable anywhere on support apparatus 150, such as, but not limited to, its headboard 32, its footboard 34, or any other location thereon. A user then steers and powers base 152 by touching the appropriate icons, or other graphical controls, that appear on the screen of touch screen controller 142. Touch screen controller 142 communicates with base 152 over a wired connection or a wireless connection (including, but not limited to, the inductive connections discussed above).

In another embodiment, patient support apparatus 150 has a controller already integrated into it that controls base 152 when it is coupled to support apparatus 150. As with controller 142, the electrical connection between this controller and base 152 is wired in some embodiments and wireless (including inductive coupling) in others. In still other embodiments, patient support apparatus 150 has one or more force sensors 52 built into it that communicate with base 152 and a movement controller 50 positioned thereon in order to control base 152 in any of the manners discussed above with respect to the various mobile patient support apparatuses 20. By utilizing mobility bases 152 that are separate from non-mobile patient support apparatuses 20, a healthcare institution can reduce the expense of purchasing support apparatuses 20 that are all mobile, but instead can purchase the less expensive non-mobile support apparatuses 150 and a smaller number of mobility bases 152.

FIG. 35 illustrates an alternative control system 110 that is able to be incorporated into any of the patient support apparatus 20 discussed herein. In this embodiment, movement controller 50 is connected to an on-board communication network 170 that is in electrical communication with a plurality of other controllers. Internal communications network 170 can be a Controller Area Network (including CANOpen, DeviceNet, and other networks having a CAN physical and data link layer), a LONWorks network, a Local Interconnect Network (LIN), a FireWire network, an Ethernet, or any other known network for communicating messages between electronic structures on patient support apparatus. It could also be a plurality of controllers connected by point-to-point communication, such as, but not limited to, controllers connected by universal serial bus (USB) connections, I squared C connections, or other point-to-point communication protocols. Internal communications network 170 includes a number of controllers or internal nodes that are in communication with each other over the internal network 170. In addition to movement controller 50, these include a footboard controller 172, a sensor controller 174, a scale system controller 176, a first side rail controller 178, a second side rail controller 180, an interface controller 182, and a headboard controller 184. Before describing in further detail the structure and functions of these controllers, it should be pointed out that fewer and/or more controllers could be used with network 170 than the specific ones illustrated. Further, in some embodiments, the functions of one or more controllers are combined into other controllers, and/or the functionality of the controllers is changed.

Each controller that communicates over internal communications network 170 includes one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Side rail controllers 178 and 180 are physically positioned inside of a pair of side rails 44, while headboard controller 184 and footboard controller 172 are positioned inside of headboard 32 and footboard 34, respectively. Other locations for these controllers may also be implemented.

Each controller in FIG. 35 typically includes a circuit board that contains the electronics necessary for controlling a user interface, one or more actuators, one or more sensors, and one or more other electrical components. For example, side rail controllers 178 and 180, as well as footboard controller 172, include one or more user controls 186. The user controls 186 include one or more buttons or switches, or the like, or they include a touch screen, or other device for allowing a patient or caregiver to control one or more aspects of patient support apparatus 20. Such aspects include the pivoting of the patient support deck 30, the activation and deactivation of the brake, the control of a bed exit alarm system, the control of height adjustment mechanisms 26, and other features of the patient support apparatus 20.

Sensor controller 174 is shown to interact with one or more sensors, including, but not limited to, one or more object sensors 108 and one or more RF ID sensors 70, both of which have been described previously and need not be discussed further. Additional sensors may feed into controller 174, such as, but not limited to, one or more sensors for detecting the activation of the brake, and/or angle sensors for detecting the angular orientation of one or more components of support apparatus 20, such as the head section 36 of support deck 30. Controller 174 is responsible for processing the outputs of all of the sensors it communicates with and forwarding messages containing the sensed information to the network 170 for use by any of the other controllers.

Movement controller 50 is in communication with one or more driving motors 54 and one or more steering motors 56. Movement controller 50 is also in communication with network 170 where it receives information from the various force sensors 52 that are positioned on patient support apparatus 20. As shown in the embodiment of FIG. 35, there may be a plurality of force sensors 52, and these force sensors 52 may be coupled to different controllers. For example, in the illustrated embodiment, there are one or more force sensors 52 that feed into footboard controller 172, one or more force sensors 52 that feed into first side rail controller 178, one or more force sensors 52 that feed into second side rail controller 180, and one or more force sensors 52 that feed into a headboard controller 184. These controllers receive the force sensor outputs, process them accordingly, and forward them onto network 170, where they are picked up by controller 50 and acted upon accordingly (in one or more of the manners that have been previously described). In alternative embodiments, force sensors 52 feed directly into movement controller 50 (rather than via network 170), or force sensors 52 all feed exclusively into only a single one of the many controllers, instead of the multiple controllers of FIG. 35, wherein that single controller then forwards the information from all of the force sensors 52 to controller 50 via network 170.

Network 170 may include, as noted, an interface controller 182 that generally oversees communication between patient support apparatus 20 and one or more off-board electronic devices. This communication is controlled via one or more transceivers 188 in electrical communication with controller 182. Transceivers 188 allow support apparatus 20 to communicate with bed mover 130, mobility base 152, and/or for any other electronic device that is separate from support apparatus 20. In some instances, interface controller 182 may also control communications between patient support apparatus 20 and a healthcare computer network, such as a healthcare Ethernet, or other type of network. Interface controller 182 may also control or oversee any of the communications disclosed in commonly assigned U.S. patent application Ser. Nos. 61/548,491, filed Oct. 18, 2011, by applicants Hayes et al., and entitled PATIENT SUPPORT APPARATUS WITH IN-ROOM DEVICE COMMUNICATION, and 61/640,138 filed Apr. 30, 2012, by applicants Hayes et al., and entitled PATIENT SUPPORT APPARA- TUS COMMUNICATION SYSTEMS, the complete disclosures of which are both hereby incorporated herein by reference Scale system controller 176 is in communication with a plurality of sensors, such as load cells 190, that are used for detecting patient weight and/or patient presence. The operation of the load cells, in one embodiment, is in accord with the system disclosed in commonly assigned U.S. Pat. No. 5,276,432 issued to Travis and entitled PATIENT EXIT DETECTION MECHANISM FOR HOSPITAL BED, the complete disclosure of which is hereby incorporated herein by reference). The load cells 190, in addition to detecting patient weight, are also able to be used—in one embodiment—for controlling movement of one or more movable portions of patient support apparatus 20, such as is disclosed in commonly assigned U.S. patent application Ser. No. 13/767,943, filed Feb. 15, 2013, by applicant Donna-Marie Robertson et al., and entitled PATIENT SUPPORT APPARATUS AND CONTROLS THEREFOR, the complete disclosure of which is incorporated herein by reference.

It will be understood by those skilled in the art that, in all of the embodiments discussed herein, the sensing of forces by force sensors 52 is carried out repetitively and/or continuously during the movement of the patient support apparatus. In some embodiments, this sensing of forces is performed multiple times per second. The information from the repetitive sensor readings is continuously or repetitively forwarded to movement controller 50 in order to adjust, as necessary, the commands issued to either or both of steering motor(s) 56 and driving motor(s) 54. In this manner, the response to changing forces, as sensed by sensors 52, is updated many times a second so that movement of the support apparatus 20 will respond to changing applied forces. In some embodiments, the movement of patient support apparatus 20 is a closed loop control system based on the force inputs, while in other embodiments the control is open loop.

In any of the embodiments discussed above where the patient support apparatus is configured to provide both powered translational motion and powered rotational motion, controller 50 makes the decision as to which one of, or both of, these types of movements to effectuate based upon several different factors, depending upon the specific configuration of the patient support apparatus. In some embodiments, a speed sensor (not shown) is included that detects the speed of the movement of the patient support apparatus and this speed value is fed to controller 50. Based upon the current speed of patient support apparatus 20, controller 50 decides whether to apply translational forces, rotational forces, or a combination thereof, in response to the forces detected by the force sensors 52. For example, in one embodiment, any detected force inputs from force sensors 52 will result in controller 50 causing purely translational motion of the support apparatus if the speed sensor(s) indicates that the support apparatus is currently traveling under a threshold speed. If the support apparatus is currently traveling at a speed equal to, or faster than, the threshold speed, then any forces detected by force sensors 52 will be processed by controller 50 in a manner that causes powered rotation of the support apparatus to occur. The current speed of the patient support apparatus may alternatively be used in different manners to control whether translational or rotational motion is applied.

In still other embodiments, controller 50 will only allow lateral translational movement (i.e. in the direction of arrow 66 of FIG. 15) if the speed sensor(s) detect a current speed of the patient support apparatus that is below the threshold, depending upon the configuration of force sensors 52 and the forces being applied to them. In other words, while the support apparatus is below the threshold speed, controller 50 supplies power to the motors 54 and/or 56 in any manner (lateral translation, longitudinal translation, and/or clockwise or counterclockwise rotation), depending upon the forces applied by a user to force sensors 52. However, once the patient support apparatus meets or exceeds the threshold speed limit, controller 50 only applies powered movement that effects longitudinal translation and/or clockwise or counterclockwise rotation, and will exclude the possibility of lateral translation. In still other embodiments, the decision as to whether drive motors 54 and/or 56 in a manner that causes lateral translation, longitudinal translation (e.g. direction 88 of FIG. 15), or clockwise or counterclockwise rotation is made without taking into account the current speed of the support apparatus.

In one embodiment, controller 50 will direct motors 54 and/or 56 to generate a purely lateral translation of support apparatus 20 only when the one or more force sensors 52 detect forces in the lateral direction (e.g. 66 of FIG. 15). In this embodiment, the controller 50 directs motors 54 and/or 56 to provide longitudinal power when the magnitude and direction of forces applied to at least two force sensors 52 are the same, or have nearly the same direction and nearly the same magnitude. Further, in this embodiment, the controller 50 directs motors 54 and/or 56 to rotate the support apparatus based upon the difference, if any, in the magnitude and/or direction of forces applied to the two or more force sensors 52. Thus, for example, if a caregiver pushes forward on a pair of force sensors 52 with generally the same magnitude, controller 50 directs motors 54 and/or 56 to longitudinally translate the support apparatus forward without rotation. If a caregiver pushes forward on one force sensor 52 and pulls backward on the other force sensor 52, controller 50 directs motors 54 and/or 56 to rotate the support apparatus without either longitudinal or lateral translation (and the direction of rotation will depend upon which force sensor is pushed forward and which is pulled backward). If the caregiver applies a purely lateral force to one or both of the force sensors 52, then controller 50 directs motors 54 and/or 56 to effect a purely lateral translation of the patient support apparatus. Further, if mixtures of these forces are applied, controller 50 applies the appropriate combination of translation and rotation. Thus, for example, if a caregiver pushes forward on both force sensors 52 but with magnitudes of force that are different from each other by more than a threshold amount, controller 50 controls motors 54 and/or 56 to apply both a forward longitudinal translation and some amount of rotation—the amount being dependent upon the degree of difference in the magnitude of the applied forces.

In still other embodiments, the movement of the patient support apparatus is controlled in yet other manners. As but one example, one or more joysticks are added to the patient support apparatus. Controller 50 reads the forces applied to the joystick and moves the patient support apparatus accordingly. Such movement involves purely translational movement of the support apparatus in the direction corresponding to the direction in which the joystick was pushed or pulled. Rotational movement is implemented, for example, only if the joystick itself is twisted (i.e. a rotational force was applied to it by a user that tended to rotate the joystick about a generally vertical rotational axis). Still other implementations are possible.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:
   a base having a plurality of wheels;
   a litter frame supported on the base;
   a patient support deck supported on the litter frame, the patient support deck adapted to support a patient;
   a first motor adapted to provide power to a powered wheel, the powered wheel being one of the plurality of wheels;
   a second motor adapted to steer a steerable wheel, the steered wheel being one of the plurality of wheels;
   a plurality of object sensors adapted to detect a location of an object in a healthcare facility relative to the patient support apparatus;
   a docking sensor adapted to communicate with a locating unit mounted to a wall of the healthcare facility; and
   a controller adapted to control a direction and speed of the patient support apparatus using the first and second motors and outputs from the plurality of object sensors, the controller further adapted to control movement of the patient support apparatus when the docking sensor communicates with the locating unit such that patient support apparatus is automatically moved and steered into a docking location adjacent the locating unit.

2. The patient support apparatus of claim 1 further comprising a docking control positioned on the patient support apparatus and adapted to be activated by a user, wherein the controller is adapted to automatically move and steer the patient support apparatus into the docking location adjacent the locating unit in response to the user activating the docking control.

3. The patient support apparatus of claim 1 wherein the plurality of object sensors are adapted to detect a location of a corner in a healthcare facility relative to the patient support apparatus, and wherein the controller is further adapted to control movement of the patient support apparatus when the object sensor detects a corner such that the patient support apparatus stays within a predetermined distance of the detected corner as the patient support apparatus moves around the detected corner.

4. The patient support apparatus of claim 1 wherein the plurality of object sensors are selected from the group consisting of cameras, ultrasonic sensors, laser range finders, and infrared sensors.

5. The patient support apparatus of claim 1 further comprising a third motor adapted to steer a second steered wheel, wherein the second steered wheel is located adjacent a back end of the patient support apparatus and the steered wheel is located adjacent a front end of the patient support apparatus.

6. The patient support apparatus of claim 1 wherein the powered wheel and the steered wheel are the same wheel.

7. The patient support apparatus of claim 1 wherein the patient support apparatus is one of a bed or a stretcher.

8. The patient support apparatus of claim 1 further comprising a force sensing system adapted to detect forces exerted by a user, wherein the controller is adapted to control the first and second motors based upon information received from the force sensing system.

9. The patient support apparatus of claim 8 further including a plurality of side rails, and wherein the force sensing system includes a plurality of force sensors mounted to the plurality of side rails.

10. The patient support apparatus of claim 9 wherein the plurality of force sensors are adapted to determine both a magnitude and direction of force applied thereto, the controller adapted to steer the steerable wheel and power the powered wheel in a manner that is based upon the magnitude and direction.

11. The patient support apparatus of claim 1 further including a force sensor positioned to detect forces exerted in a generally horizontal orientation against the litter frame, the force sensor adapted to determine a location on the patient support apparatus of the applied forces relative to a reference location on the patient support apparatus, wherein the controller is further adapted to control the powered wheel and the steerable wheel in a manner that takes into account a magnitude, direction, and location of the applied forces relative to the reference location.

12. The patient support apparatus of claim 1 further comprising a force sensing system adapted to detect forces exerted by a user onto the patient support apparatus, wherein the controller is further adapted to control the first and second motors based upon information received from the force sensing system, and wherein the controller is still further adapted to use outputs from the object sensor to determine when the user is directing the patient support apparatus toward an opening and to automatically override the information received from the force sensing system to the extent necessary to ensure that the patient support apparatus is steered through the opening without collision with the wall.

13. The patient support apparatus of claim 12 wherein the force sensing system is adapted to detect both a magnitude and a direction of a horizontal component of the exerted forces, and the controller is adapted to steer the steered wheel and power the powered wheel based upon the magnitude and direction of the exerted forces.

14. The patient support apparatus of claim 13 wherein the force sensing system includes a plurality of force sensors positioned at different locations on the patient support apparatus.

15. The patient support apparatus of claim 14 wherein the controller is adapted to steer the steered wheel and power the powered wheel based at least partially upon locations of the force sensors relative to a reference point on the patient support apparatus.

16. The patient support apparatus of claim 14 wherein the force sensing system is adapted to detect forces exerted in a generally horizontal orientation against the litter frame, the force sensing system adapted to determine a location on the patient support apparatus of the applied forces relative to a reference location on the patient support apparatus, wherein the controller is further adapted to control the powered wheel and the steerable wheel in a manner that takes into account the magnitude, direction, and location of the applied forces relative to the reference location.

17. The patient support apparatus of claim 14 wherein the controller is further adapted to determine a width of the opening and, if the width is too small for the patient support apparatus, to automatically bring the patient support apparatus to a complete stop.

18. The patient support apparatus of claim 14 further including a plurality of object sensors adapted to detect a location of the opening relative to the patient support apparatus.

19. The patient support apparatus of claim 18 wherein the plurality of object sensors are selected from the group consisting of cameras, ultrasonic sensors, laser range finders, and infrared sensors.

20. The patient support apparatus of claim 13 further comprising a third motor adapted to steer a second steered wheel, wherein the second steered wheel is located adjacent a back end of the patient support apparatus and the steered wheel is located adjacent a front end of the patient support apparatus.

* * * * *